United States Patent
Ohta et al.

(10) Patent No.: US 10,015,711 B2
(45) Date of Patent: Jul. 3, 2018

(54) WIRELESS COMMUNICATION SYSTEM, WIRELESS BASE STATION, MOBILE STATION, AND WIRELESS COMMUNICATION CONTROL METHOD

(71) Applicant: FUJITSU LIMITED, Kawasaki-shi, Kanagawa (JP)

(72) Inventors: Yoshiaki Ohta, Yokohama (JP); Shinichiro Aikawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/461,041

(22) Filed: Mar. 16, 2017

(65) Prior Publication Data
US 2017/0188278 A1    Jun. 29, 2017

Related U.S. Application Data

(63) Continuation of application No. PCT/JP2014/076916, filed on Oct. 8, 2014.

(51) Int. Cl.
| | | |
|---|---|---|
| *H04W 36/04* | (2009.01) | |
| *H04W 36/38* | (2009.01) | |
| *H04W 36/30* | (2009.01) | |
| *H04W 36/00* | (2009.01) | |
| *H04W 88/02* | (2009.01) | |
| *H04W 88/08* | (2009.01) | |

(52) U.S. Cl.
CPC ........ *H04W 36/04* (2013.01); *H04W 36/0033* (2013.01); *H04W 36/30* (2013.01); *H04W 36/38* (2013.01); *H04W 88/02* (2013.01); *H04W 88/08* (2013.01)

(58) Field of Classification Search
CPC ..... H04W 12/06; H04W 12/12; H04W 48/02; H04W 76/042
USPC .......................... 455/410, 411, 419, 420, 444
See application file for complete search history.

(56) References Cited

U.S. PATENT DOCUMENTS

| | | | |
|---|---|---|---|
| 2012/0196603 | A1 | 8/2012 | Mochizuki et al. |
| 2015/0358863 | A1 | 12/2015 | Yamamoto et al. |
| 2016/0198390 | A1 | 7/2016 | Aminaka et al. |

FOREIGN PATENT DOCUMENTS

| | | |
|---|---|---|
| JP | 2014-138286 A | 7/2014 |
| WO | 2011/039960 A1 | 4/2011 |
| WO | 2014/103098 A1 | 7/2014 |

OTHER PUBLICATIONS

3GPP TS 36.300 V12.0.0, Dec. 2013; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12); Dec. 2013.
3GPP TS 36.211 V12.0.0, Dec. 2013; 3rd Generation Partnership Project;Technical Specification Group Radio Access Network; Evolved Universal Terrestrial Radio Access (E-UTRA); Physical channels and modulation (Release 12); Dec. 2013.

(Continued)

*Primary Examiner* — Sam Bhattacharya
(74) *Attorney, Agent, or Firm* — Myers Wolin, LLC

(57) ABSTRACT

A mobile station wirelessly communicates with a plurality of wireless base stations using multiple access. A first wireless base station in the multiple access controls a control plane of a second wireless base station in the multiple access to control a connection between the mobile station and the second wireless base station.

12 Claims, 23 Drawing Sheets

(56) References Cited

OTHER PUBLICATIONS

3GPP TS 36.212 V12.0.0, Dec. 2013; 3rd Generation Partnership Project; Technical Specification Group Radio Access Network; Evolved Universal Terrestrial Radio Access (E-UTRA); Multiplexing and channel coding (Release 12); Dec. 2013.
3GPP TS 36.213 V12.0.0, Dec. 2013; 3rd Generation Partnership Project; Technical Specification Group Radio Access Network; Evolved Universal Terrestrial Radio Access (E-UTRA); Physical layer procedures (Release 12); Dec. 2013.
3GPP TS 36.321 V12.0.0, Dec. 2013; 3rd Generation Partnership Project; Technical Specification Group Radio Access Network; Evolved Universal Terrestrial Radio Access (E-UTRA); Medium Access Control (MAC) protocol specification (Release 12); Dec. 2013.
3GPP TS 36.322 V11.0.0, Sep. 2012; 3rd Generation Partnership Project; Technical Specification Group Radio Access Network; Evolved Universal Terrestrial Radio Access (E-UTRA); Radio Link Control (RLC) protocol specification (Release 11); Sep. 2012.
3GPP TS 36.323 V11.2.0, Mar. 2013; 3rd Generation Partnership Project; Technical Specification Group Radio Access Network; Evolved Universal Terrestrial Radio Access (E-UTRA); Packet Data Convergence Protocol (PDCP) specification (Release 11); Mar. 2013.
3GPP TS 36.331 V12.0.0, Dec. 2013; 3rd Generation Partnership Project; Technical Specification Group Radio Access Network; Evolved Universal Terrestrial Radio Access (E-UTRA); Radio Resource Control (RRC); Protocol specification (Release 12); Dec. 2013.
3GPP TS 36.413 V12.0.0, Dec. 2013; 3rd Generation Partnership Project;Technical Specification Group Radio Access Network; Evolved Universal Terrestrial Radio Access Network (E-UTRAN); S1 Application Protocol (S1AP) (Release 12); Dec. 2013.
3GPP TS 36.423 V12.0.0, Dec. 2013; 3rd Generation Partnership Project; Technical Specification Group Radio Access Network; Evolved Universal Terrestrial Radio Access Network (E-UTRAN); X2 application protocol (X2AP) (Release 12); Dec. 2013.
3GPP TR 36.842 V12.0.0, Dec. 2013; 3rd Generation Partnership Project; Technical Specification Group Radio Access Network; Study on Small Cell enhancements for E-UTRA and E-UTRAN; Higher layer aspects (Release 12); Dec. 2013.
Fujitsu, "Initial analysis on the potential impact of Small Cell UP/CP alternatives on RAN3 specs", 3GPP TSG-RAN WG3 #81bis, R3-131755, Venice Italy Oct. 7-11, 2013. Cited in ISR for PCT/JP2014/076916 dated Jan. 6, 2015.
English Translation of International Search Authority for corresponding PCT/JP2014/076916 with Partial English Translation of Written Opinion of International Searching Authority for corresponding PCT/JP2014/076916 dated Jan. 6, 2015.
Kyocera, "RLF issues in dual-connectivity", 3GPP TSG-RAN WG2 Meeting #83bis, Ljubljana, Slovenia, Oct. 7-11, 2013, R2-133503, Agenda Item 7.2.2, Discussion and Decision. Dated (Sep. 28, 2013).
Korean Office Action issued for corresponding Korean Patent Application No. 10-2017-7009013, dated Mar. 6, 2018 English translation of the Office Action attached.
Japanese Office Action issued for corresponding Japanese Patent Application No. 2016-552743, dated Mar. 13, 2018. English machine translation of the Office Action attached.
Alcatel-Lucent et al., "Mobility scenarios for dual connectivity support", Agenda Item: 7.2.1, 3GPP TSG-RAN WG2 Meeting #85, R2-140743, Prague, Czech Republic, Feb. 10-14, 2014, cited on Extended European Search Report submitted on IDS dated May 2, 2018.
Non-Final Office Action issued by the United States Patent and Trademark Office for corresponding U.S. Appl. No. 15/912,113, electronically delivered on Apr. 5, 2018.
Extended European search report with supplementary European search report and the European search opinion issued by the European Patent Office for corresponding European Application No. 14903687.3, dated Apr. 10, 2018.

10

WIRELESS COMMUNICATION SYSTEM, WIRELESS BASE STATION, MOBILE STATION, AND WIRELESS COMMUNICATION CONTROL METHOD

CROSS-REFERENCE TO RELATED APPLICATION

This application is a continuation application of International Application PCT/JP2014/076916, filed on Oct. 8, 2014 and designated the U.S., the entire contents of which are incorporated herein by reference.

FIELD

The embodiments discussed herein are related to a wireless communication system, a wireless base station, a mobile station, and a wireless communication control method.

BACKGROUND

In the 3rd generation partnership project radio access network long term evolution (3GPP LTE), a technique for increasing the capacity of a system using a small cell in addition to a macro cell has been discussed. A "cell" is an example of a wireless area that is formed according to the coverage of radio waves transmitted by a wireless base station. A wireless apparatus, such as a mobile station, in a cell can wirelessly communicate with a wireless base station forming the cell.

The name of the cell may vary depending on the size of the coverage. It may be considered that the size of the coverage varies depending on the maximum transmission power of the wireless base station. For example, the "macro cell" has a coverage wider than that of a "small cell".

In 3GPP LTE-Advanced (LTE-A), a wireless communication system having a configuration in which one or a plurality of small cells are arranged so as to overlap a macro cell (which may be referred to as an "overlay configuration") has been examined. The wireless communication system (which may be referred to as a "wireless network") having the above-mentioned configuration may be referred to as a "heterogeneous network".

In the heterogeneous network, a technique in which a mobile station is connected to both a macro cell and a small cell and communicates with the cells has been examined. In addition, a technique in which a mobile station is connected to two different small cells and communicates with the cells has been examined. As such, in some cases, the aspect in which the mobile station is connected to two different small cells and communicates with the cells is referred to as dual connectivity (DC).

In the dual connectivity in which a mobile station is connected to both a macro cell and a small cell, a control plane signal including the control information of layer 3 for, for example, setting a transmission path (which may be referred to as a "path") or controlling handover (HO) is transmitted and received between the base stations forming the macro cell. In contrast, for example, a data plane signal including user data is transmitted and received between the base station forming the macro cell and the base station forming the small cell.

The control plane may be referred to as, for example, a C plane or a signaling radio bearer (SRB). The data plane may be referred to as, for example, a user plane (U plane) or a data radio bearer (DRB).

The base station to which the control plane is connected may be referred to as a "primary base station". The base station which performs communication in cooperation with the primary base station and to which the data plane is connected may be referred to as a "secondary base station".

The primary base station is referred to as an "anchor base station" or a "master base station" and the secondary base station is referred to as an "assisting base station" or a "slave base station". In the recent trend of LTE-A, the terms "master base station" and "secondary base station" are used.

LIST OF RELATED ART DOCUMENTS

Non-Patent Document(s)
Non-Patent Document 1: 3GPP TS36.300 V12.0.0 (2013 December)
Non-Patent Document 2: 3GPP TS36.211 V12.0.0 (2013 December)
Non-Patent Document 3: 3GPP TS36.212 V12.0.0 (2013 December)
Non-Patent Document 4: 3GPP TS36.213 V12.0.0 (2013 December)
Non-Patent Document 5: 3GPP TS36.321 V12.0.0 (2013 December)
Non-Patent Document 6: 3GPP TS36.322 V11.0.0 (2012 September)
Non-Patent Document 7: 3GPP TS36.323 V11.2.0 (2013 March)
Non-Patent Document 8: 3GPP TS36.331 V12.0.0 (2013 December)
Non-Patent Document 9: 3GPP TS36.413 V12.0.0 (2013 December)
Non-Patent Document 10: 3GPP TS36.423 V12.0.0 (2013 December)
Non-Patent Document 11: 3GPP TR36.842 V12.0.0 (2013 December)

One of the layers for processing the control plane signal is a radio resource control (RRC) layer. In some cases, when dual connectivity is performed, the RRC layer is provided in the master base station and is not provided in the secondary base station. In this case, the master base station (macro cell) performs various control processes including handover control for the mobile station in an integrated manner.

Therefore, for example, handover control is performed between the master base stations (macro cells). In other words, when moving between the macro cells, the mobile station transmits and receives the control plane signal related to handover control to and from the master base station. That is, the mobile station does not transmit and receive the control plane signal to and from the secondary base station (small cell) while it is positioned in the same macro cell.

Therefore, it is possible to reduce the frequency of call control switching associated with the movement of the mobile station. The call control switching may be referred to as "path switching" and may be considered as, for example, switching control from a path via a handover source base station to a path via a handover destination base station. The path switching involves signaling for a core network including the handover source base station and the handover destination base station.

The core network may include, for example, a mobility management entity (MME) or a serving gateway (SGW). The MME processes the control plane signal and the SGW processes the user plane signal.

Upon receiving a path switching signal, the MME switches a control plane connection destination and a user plane connection destination in cooperation with the SGW.

Therefore, it may be considered that a reduction in the frequency of call control switching (path switching) means a reduction in the number of signaling processes to the core network.

However, in the integrated control of the RRC layer by the macro cell, even in an environment in which the secondary base station (small cell) can be used as the handover destination, the mobile station has to be reconnected to another macro cell (master base station) as the handover destination. In other words, since it is difficult to effectively use the small cell, the performance or characteristics of wireless communication are likely to deteriorate.

SUMMARY

As one aspect, a wireless communication system includes a plurality of wireless base stations and a mobile station adapted to wirelessly communicate with the plurality of wireless base stations using a multiple access. A first wireless base station in the multiple access controls a control plane of a second wireless base station in the multiple access to control a connection between the mobile station and the second wireless base station.

As another aspect, a wireless base station includes a communication circuitry configured to wirelessly communicate with a mobile station using a multiple access including a connection with the mobile station through another wireless base station and a connection with the mobile station without being routed through said another wireless base station and a controller configured to control a control plane of said another wireless base station to control a connection between the mobile station and said another wireless base station.

As still another aspect, a wireless base station includes a communication circuitry configured to wirelessly communicate with a mobile station using a first connection in a multiple access and a controller configured to control a connection with the mobile station in response to a control for a control plane performed by another wireless base station which wirelessly communicates with the mobile station using a second connection in the multiple access.

As still another aspect, a mobile station includes a communication circuitry configured to wirelessly communicate with a plurality of wireless base stations using a multiple access and a controller configured to control a connection using a control plane for a second wireless base station in the multiple access, the second wireless base station being controlled according to a control of the control plane by a first wireless base station in the multiple access.

As still another aspect, a wireless communication control method includes: wirelessly communicating, by a mobile station, with a plurality of wireless base stations using a multiple access; and controlling, by a first wireless base station in the multiple access, a control plane for a second wireless base station in the multiple access to control a connection between the mobile station and the second wireless base station.

According to one aspect, it is possible to improve the performance or characteristics of wireless communication.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
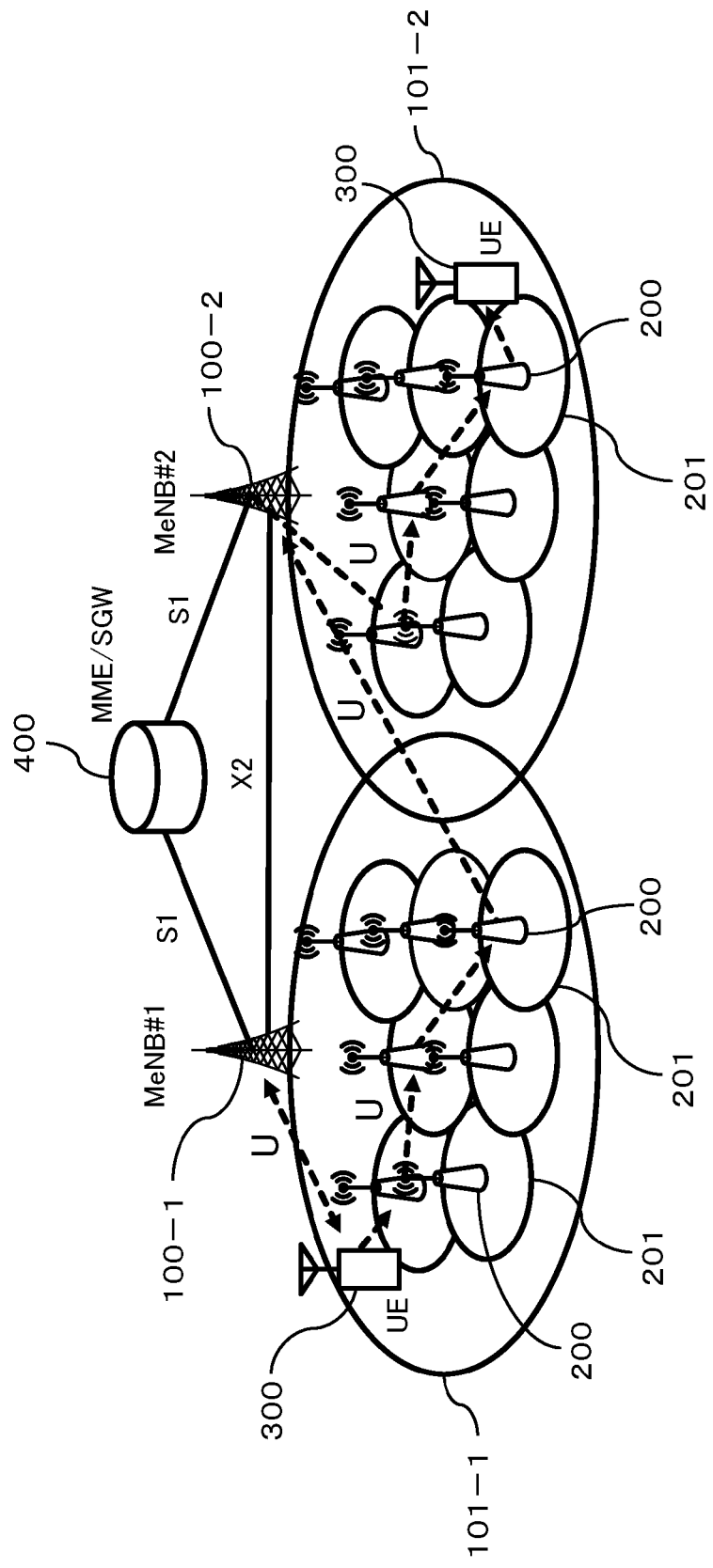
FIG. 1 is a diagram illustrating an exemplary configuration of a wireless communication system according to a first embodiment.

Hereinafter, an exemplary embodiment(s) will be described with reference to the drawings. However, the embodiment(s) described below is merely an example and not intended to exclude an application of various modifications or techniques which are not explicitly described below. Further, various exemplary aspects described below may be appropriately combined and carried out. Elements or components assigned the same reference numeral in the drawings used for the following embodiment(s) will represent identical or similar elements or components unless otherwise specified.

(General Outline)

Figure 23:
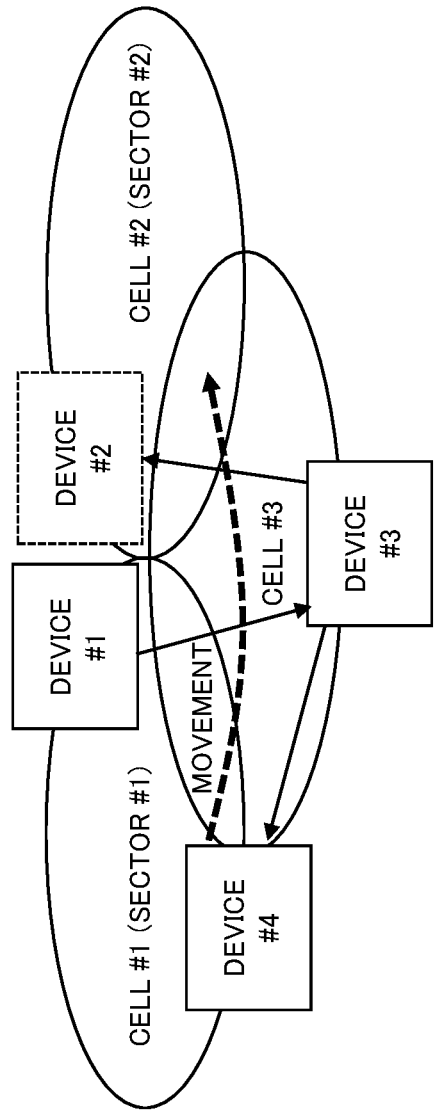
FIG. 23 is a block diagram illustrating an exemplary configuration of a system for explaining a general outline of the embodiment.

FIG. 23 illustrates an exemplary configuration of a system according to an embodiment. The system illustrated in FIG. 23 includes, for example, devices #1 to #4. A "cell" is an example of an area which is formed (or provided) by the devices and in which wireless communication is available.

For example, cell #1 may be provided by device #1, cell #2 may be provided by device #2, and cell #3 may be provided by device #3. When a plurality of cells are formed by the same device, the cell may be referred to as a "sector". For example, in FIG. 23, when cell #2 is formed by device #1, cell #2 may be referred to as sector #2.

In this embodiment, a first wireless station which is an example of device #1 may control a control plane (C plane) of a third wireless station which is an example of device #3. Device #4 may be a mobile wireless station (fourth wireless station). With the movement of device #4, the control plane may be controlled.

As an example of a control method, the first wireless station #1 transmits first information related to the control plane to the third wireless station #3 to control the control plane of the third wireless station #3.

When receiving the first information, the third wireless station #3 may transmit a control signal for controlling the movement (mobility) of the fourth wireless station #4. As such, the wireless station connected to the fourth wireless station #4 can be controlled by the control signal. An example of the control method will be described in detail in a first embodiment which will be described below.

As another control method, the first wireless station #1 may transmit second information related to a control plane to the third wireless station #3 to control the control plane of the third wireless station. When receiving the third information, the third wireless station #3 may transmit fourth information for controlling the movement of the fourth wireless station #4 to the second wireless station #2. As such, the wireless station connected to the fourth wireless station #4 can be controlled by the fourth information. An example of the control method will be described in detail in a second embodiment which will be described below.

The above-mentioned control makes it possible to prevent the deterioration of a communication performance or characteristics caused by, for example, the movement of the fourth wireless station and to improve the communication performance or characteristics.

First Embodiment

FIG. 1 is a diagram illustrating an exemplary configuration of a wireless communication system according to the first embodiment. A wireless communication system 10 illustrated in FIG. 1 includes, for example, wireless base stations 100-1 and 100-2, a wireless base station 200, a mobile station 300, and a core network 400. This embodiment may be considered as an embodied example of the content described in "Outline". Therefore, of course, this embodiment may be made in combination with the content described in "Outline".

For example, the wireless base stations 100-1 and 100-2 form macro cells 101-1 and 101-2, each of which is an example of a wireless area, respectively. When the wireless base stations 100-1 and 100-2 do not need to be distinguished from each other, they are referred to as "wireless base stations 100". Similarly, the macro cells 101-1 and 101-2 do not need to be distinguished from each other, they are referred to as "macro cells 101". As a non-limiting example, the macro cell 101 may have a coverage radius of 1 km to several tens of kilometers. In LTE, the macro cell 101 is available to cover a coverage radius of about 100 km according to specifications.

The wireless base station 100 forming the macro cell 101 is an example of a first wireless base station and may be referred to as a "macro base station 100". The macro base station 100 may also be referred to as a "master base station 100" and is, for example, an evolved Node B (eNB). The eNB serving as the master base station 100 may be referred to as "MeNB". In FIG. 1, for example, the master base station 100-1 is represented by "MeNB#1" and the master base station 100-2 is represented by "MeNB#2".

One or a plurality of wireless base stations 200 may be installed (configured in overlay) in one or both of the macro cells 101. The wireless base station 200 forms a small cell 201, for example. The small cell 201 may include a cell such as a "femtocell", a "picocell", a "microcell", or a "metrocell", which has a coverage smaller than that of the macro cell 101.

The wireless base station 200 forming the small cell 201 is an example of a second wireless base station and may be referred to as a "small base station 200". The small base station 200 may also be referred to as a "secondary base station 200" with respect to the master base station 100 and may be an eNB, for example. The eNB serving as the secondary base station 200 may be referred to as "SeNB". FIG. 1 illustrates an aspect in which the macro cells 101-1 and 101-2 have the same number of small cells 201. However, the macro cells 101 may have different numbers of small cells 201.

The master base station 100 and the secondary base station 200 may be connected to the core network 400 so as to communicate with the core network 400. The connection may be a wired connection, for example. However, a wireless connection may also be used. For example, an S1 interface may be used for the wired connection. The core network 400 may include an MME or an SGW. Therefore, in some cases, the core network 400 may be referred to as an "MME/SGW 400" for descriptive purposes.

The master base stations 100 may be communicably connected each other, and the master base station 100 and the secondary base station 200 may be communicably connected each other. The connection may be a wired connection, for example. However, a wireless connection is not excluded. The wired connection may be an X2 interface, for example. The X2 interface is an example of a communication interface between the base stations.

The mobile station 300 is available to wirelessly communicate with the macro base station 100 in the macro cell 101 and is also available to wirelessly communicate with the small base station 200 in the small cell 201. The mobile station 300 may be referred to as a user equipment (UE) 300. The "wireless communication" may be considered as communication through a radio link. The "radio link" may be referred to as a "wireless bearer". The UE 300 is available to wirelessly communicate with the macro base station 100 and the small base station 200 by using a dual connectivity in some cases of its position.

Figure 2:
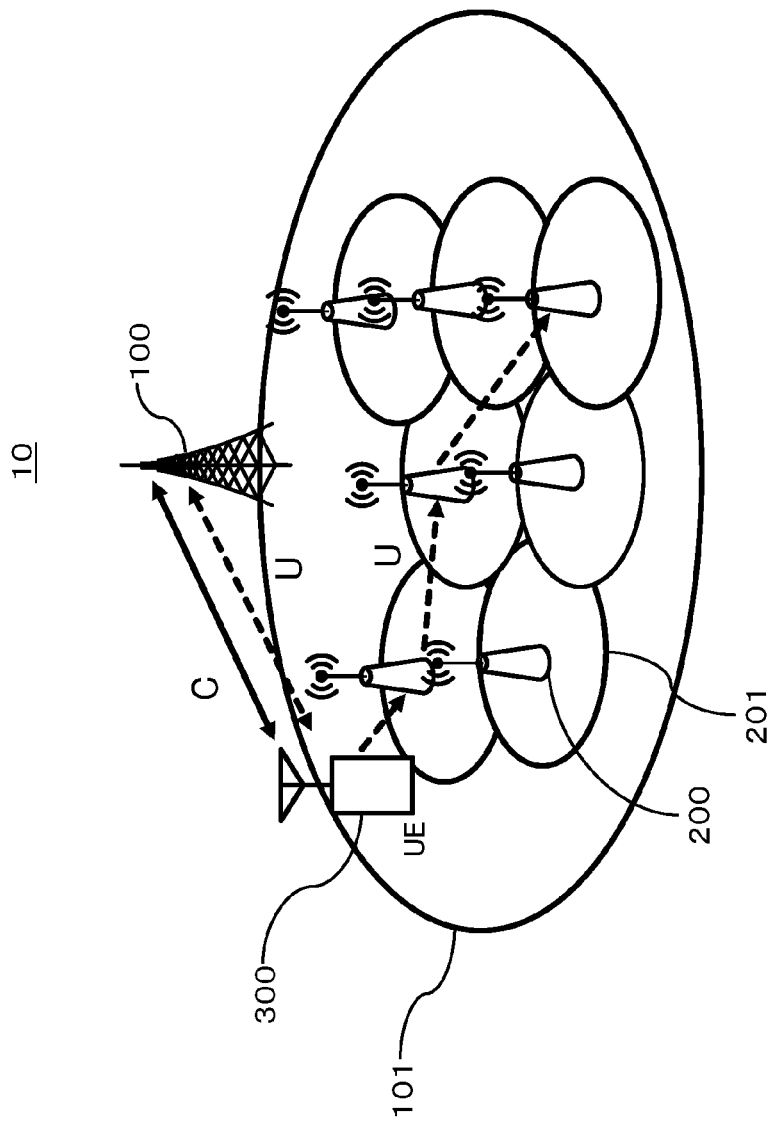
FIG. 2 is a diagram illustrating multiple access in a wireless communication system illustrated in FIG. 1.

As illustrated in FIG. 2, in the dual connectivity, the UE 300 may be connected to the macro base station (master base station) 100 by a radio link including a control plane represented by a solid arrow C and a user plane represented by a dotted arrow U. In addition, the UE 300 may be connected to the small base station (secondary base station) 200 by a radio link including the user plane represented by the dotted arrow U.

In other words, the UE 300 may be connected to both of the master base station 100 and the secondary base station 200 by the user planes and may also be connected to the master base station 100 by a control plane that is common to the user planes.

In a case where the UE 300 is connected to different small cells 201, for example, a control plane signal may be transceived between the UE 300 and one of the small base stations 200, and a data plane signal may be transceived between the UE 300 and another small base station 200. The data plane signal may be transceived between the UE 300 and a plurality of small base stations 200 including the small base station 200 that transceives the control plane signal.

FIGS. 1 and 2 illustrate an example of the configuration in which the whole coverage of the small cells 201 is included in the macro cell 101. However, there may be a small cell 201, of which the coverage is partially included in the macro cell 101. For example, as illustrated in FIG. 3, the small cell 201 may be arranged at the boundary between the macro cells 101-1 and 101-2.

However, the wireless area is not limited to this example. For example, in the example illustrated in FIG. 3, the macro cell 101-1 and the macro cell 101-2 are formed by the base stations 100-1 and 100-2 which are physically different from each other, respectively. However, the macro cell 101-1 and the macro cell 101-2 may be physically formed by a single base station. In this case, the term "cell" is available, but the term "sector" may be more intuitive than the term "cell".

Figure 3:
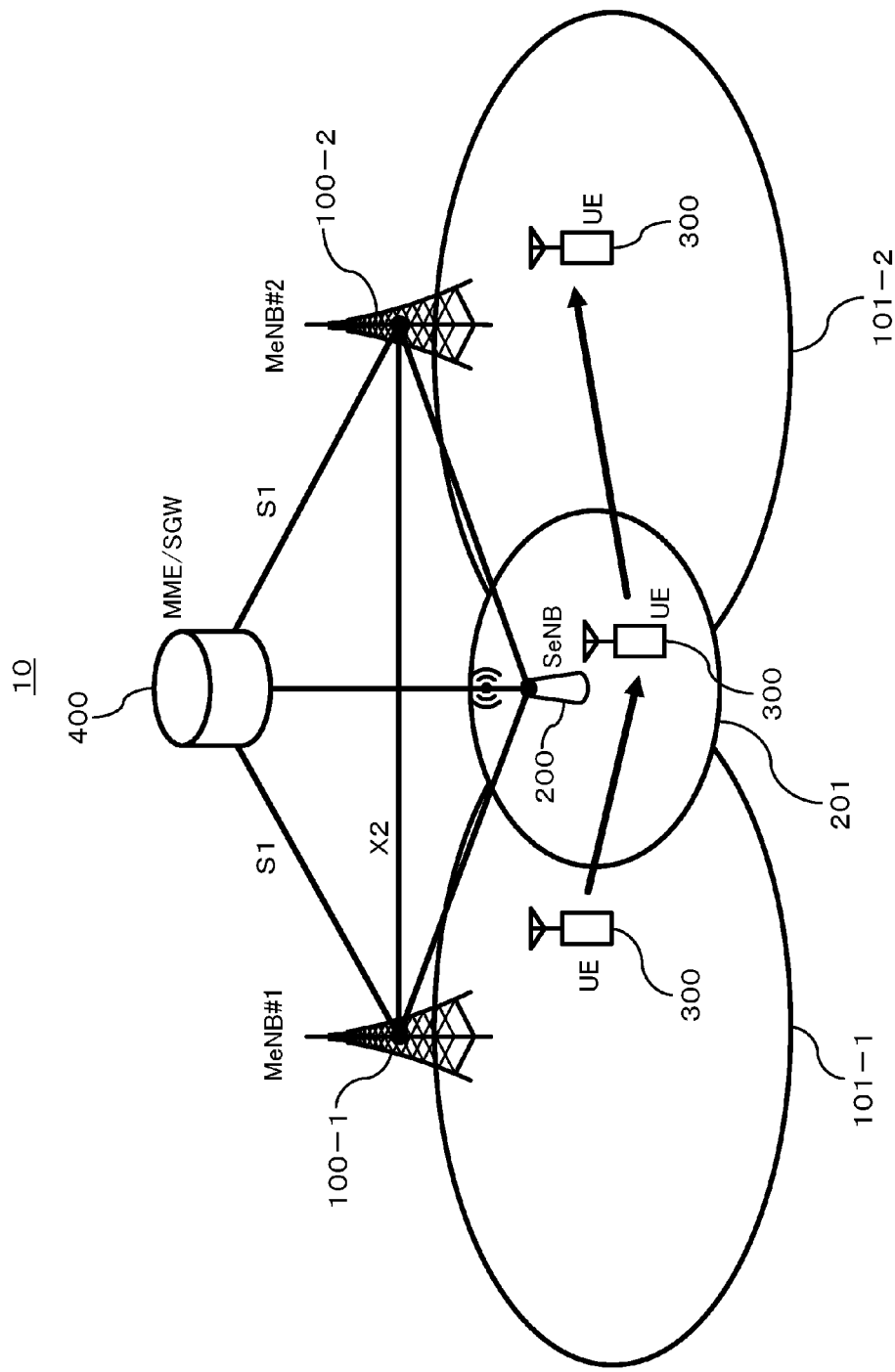
FIG. 3 is a diagram illustrating another exemplary configuration of cells in the wireless communication system according to the first embodiment.

Here, a case in which the UE 300 positioned at the macro cell 101-1 moves to another macro cell 101-2 via the small cell 201, as represented by a solid arrow in FIG. 3, is assumed. As illustrated in FIG. 4A, it is assumed that an RRC layer that processes the control plane is provided only in the master base station 100 among the master base station 100 and the secondary base station 200.

However, a function of processing the RRC layer may be provided in the secondary base station 200. In other words, the secondary base station 200 may have the function of processing the RRC layer but the function of processing the RRC layer may be disabled.

For example, in some cases, the secondary base station 200 receives an RRC signal related to the setting or resetting of multiple access from the master base station 100. Further, in some cases, the secondary base station 200 transmits an RRC signal to the master base station 100. The RRC signal may be transmitted as a message that is called an "X2 message". The message may be referred to as an inter-node RRC message, for example.

As described above, a state in which the function of processing the RRC layer is disabled may be referred to as a "stop state", a "prohibited state", a "disabled state" or a "sleep state" of the RRC layer.

In other words, the secondary base station 200 has a potential to process the RRC layer but the potential may be considered to be in the stop, prohibited, disabled, or sleep state. The configuration in which the RRC layer is centralized in the master base station 100 may be considered as that the secondary base station 200 is set in the above-mentioned state.

Figure 4B:
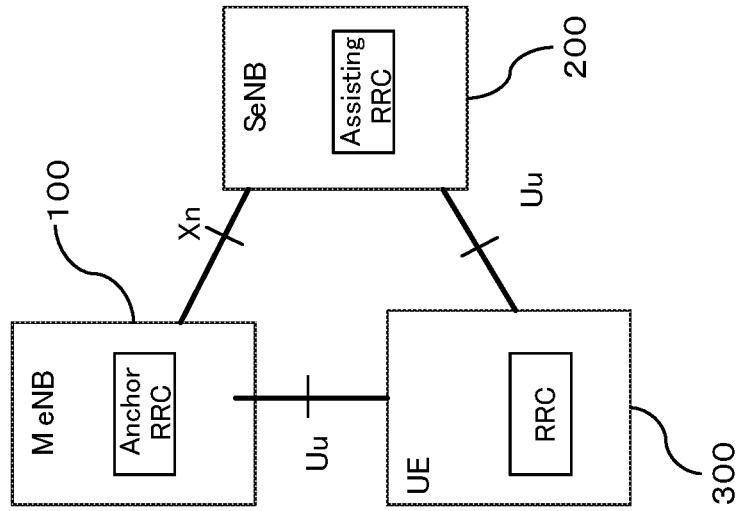
FIG. 4B is a diagram illustrating an aspect of the distributed arrangement of the RRC layer in the master base station and a secondary base station.
Figure 4A:
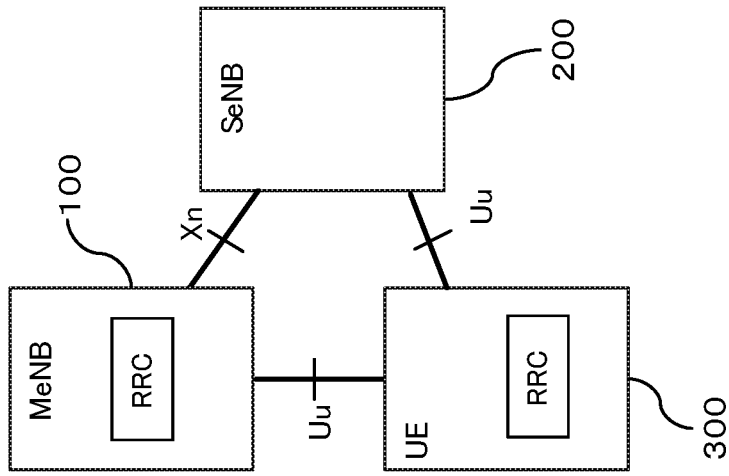
FIG. 4A is a diagram illustrating an aspect of the centralized configuration of an RRC layer in a master base station.

FIG. 4B illustrates another exemplary configuration of the RRC layer and illustrates an example in which the RRC layers are provided as an "anchor RRC" and an "assisting RRC" in both of the master base station 100 and the secondary base station 200. This exemplary configuration was a potential candidate in 3GPP but was not finally agreed.

In the example illustrated in FIGS. 3 and 4A, it is assumed that a radio link failure (RLF) occurs between the master base station 100 and the UE 300. The RLF may occur when the master base station 100-1 fails to track a movement of the UE 300 and fails in transmitting a handover command or when a quality of a radio link between the master base station 100 and the UE 300 suddenly deteriorates due to a shadowing, for example.

When the RLF occurs, the UE 300 subjectively and autonomously searches for an available master base station 100 to which the UE 300 can be connected, and tries to connect a control plane (in other words, reestablish connection of the RRC layer).

Figure 5:
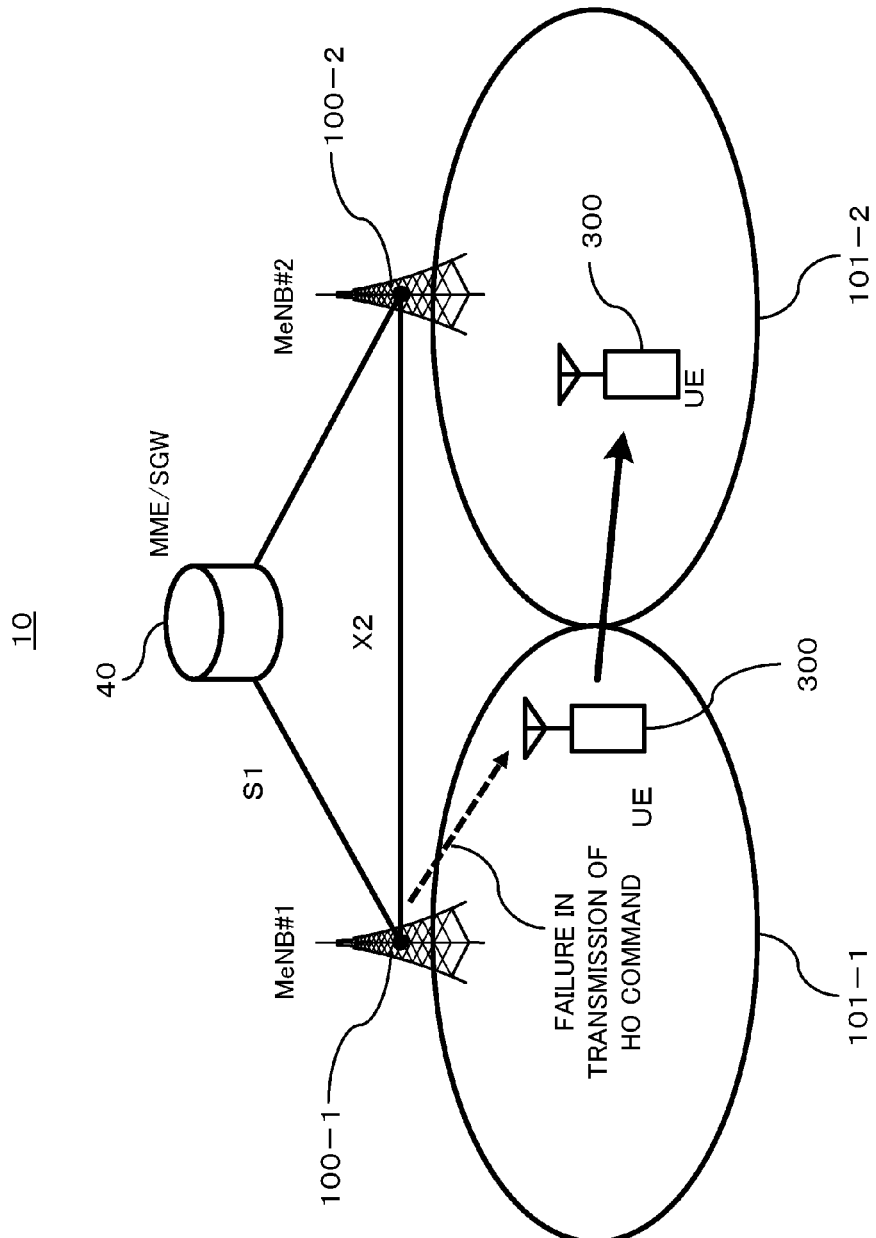
FIG. 5 is a diagram illustrating an example of a handover failure between macro cells.

For example, it is assumed that the master base station 100-1 failed to transmit a handover (HO) command since the UE 300 moved from the macro cell 101-1 to another macro cell 101-2 at a high speed, as illustrated in FIG. 5.

Figure 6:
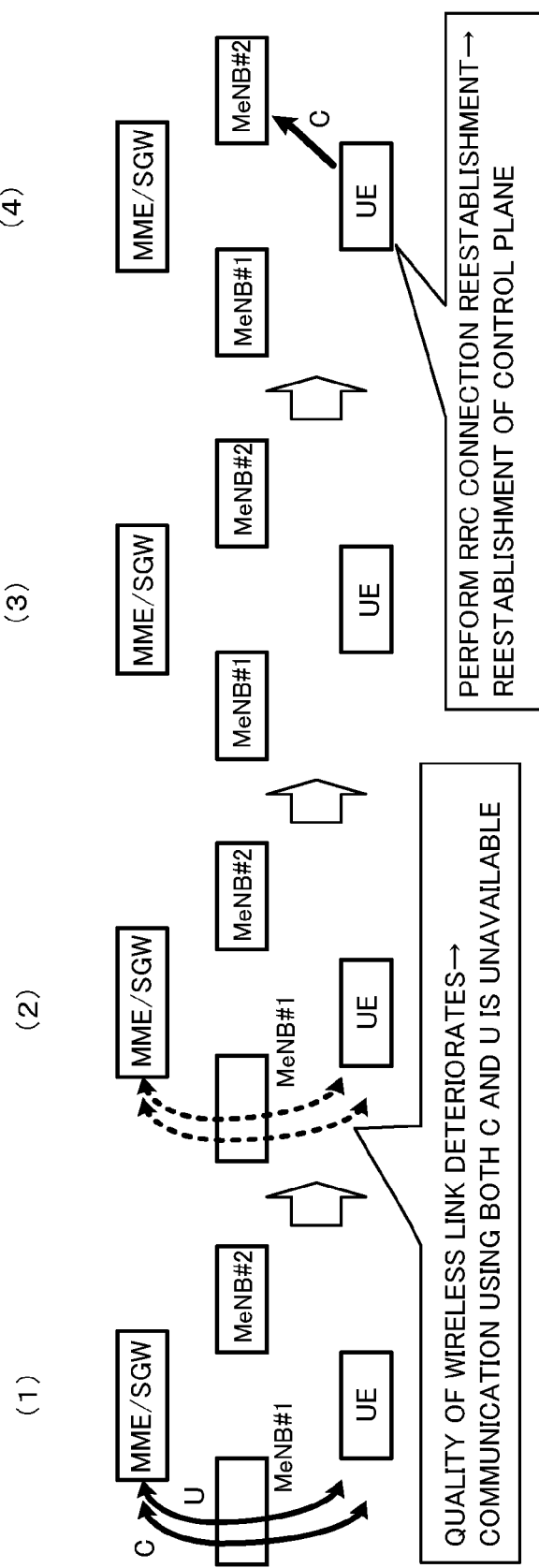
FIG. 6 is a diagram illustrating the connection reestablishment of a control plane when a handover failure occurs between the macro cells.

In this case, as illustrated in (1) and (2) of FIG. 6, the quality of a radio link between the UE 300 and the master base station 100-1 deteriorates and communication using the control plane and the user plane becomes unavailable (see a dotted arrow). As a result, an RLF occurs.

When the RLF occurs, both of the control plane and the user plane which have been set and established are released as illustrated in (3) of FIG. 6. After that, as illustrated in (4) of FIG. 6, when the UE 300 moves to a position where the UE 300 is available to receive radio waves in the macro cell 101-2, the UE 300 tries to reestablish the connection of the RRC layer to the master base station 100-2 to reestablish the control plane. When the control plane is reestablished, it becomes available to establish the user plane.

Figure 7:
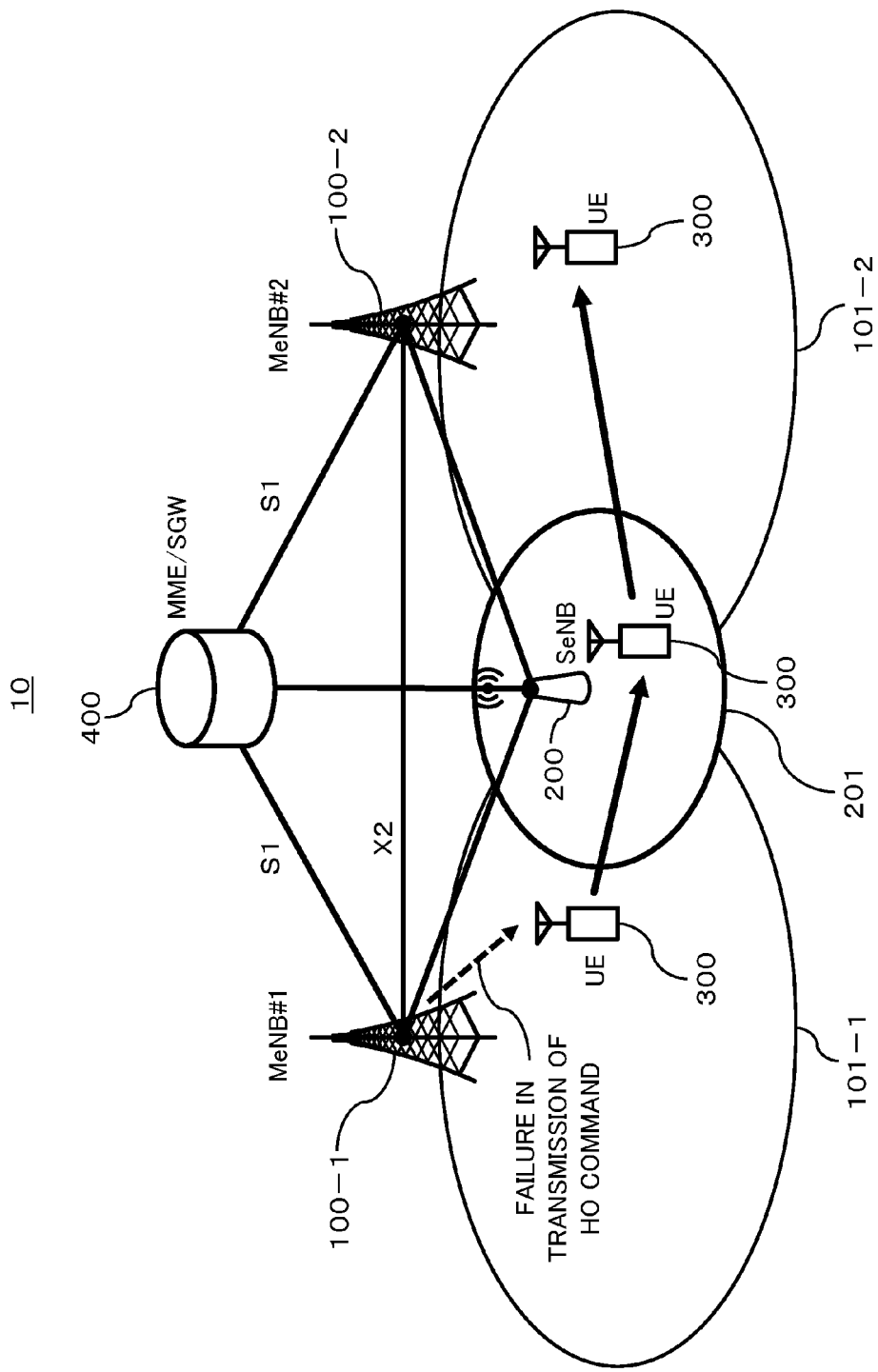
FIG. 7 is a diagram schematically illustrating a case in which the master base station fails in transmitting a handover command in the wireless communication system illustrated in FIG. 3.

The same process as described above is performed in a case where the master base station 100-1 fails to track a movement of the UE 300 and fails in transmitting an HO command, as illustrated in FIG. 7, under a state in which the UE 300 is connected to both of the macro cell 101 and the small cell 201 by the dual connectivity, as illustrated in FIG. 2.

Figure 8:
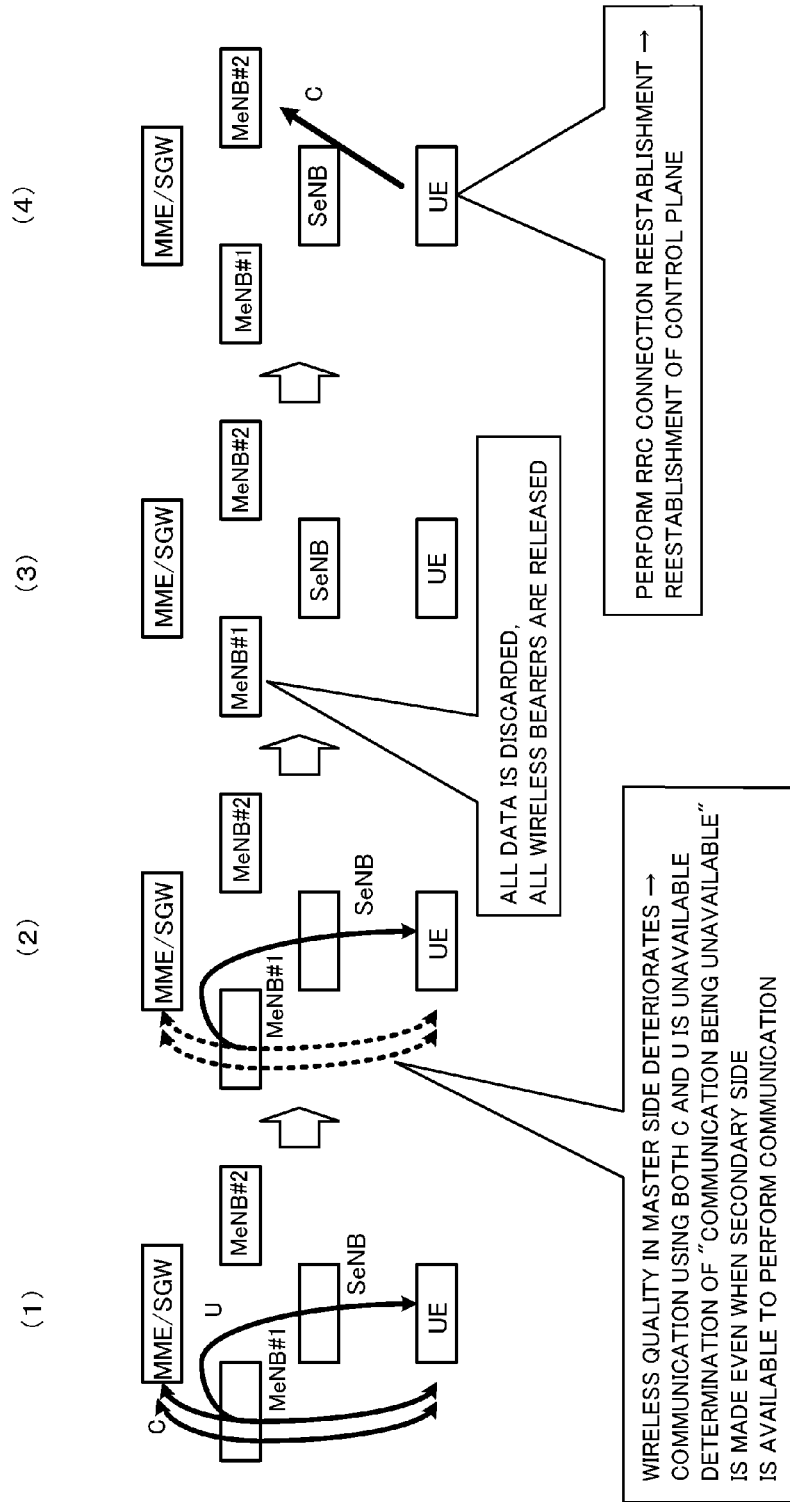
FIG. 8 is a diagram illustrating the connection reestablishment of the control plane when the master base station fails in transmitting a handover command in the wireless communication system illustrated in FIG. 3.

For example, it is assumed that, as illustrated in (1) of FIG. 8, the UE 300 is connected to both of the master base station 100-1 and the secondary base station 100-2 by the dual connectivity and performs communications over the control plane (C) and the user plane (U).

In (1) of FIG. 8, the user plane is split into two user planes in the master base station 100-1. One user plane is directly connected to the UE 300 and the other user plane is connected to the UE 300 via the secondary base station 100-2. The split user plane may be referred to as a "split bearer". The split bearer that is routed through the master base station 100 may be referred to as a "master bearer (MB)", and the split bearer that is routed through the secondary base station 200 may be referred to as a "secondary bearer (SB)".

For example, the user plane may be split in a stage before a packet data convergence protocol (PDCP) layer, between the PDCP layer and a radio link control (RLC) layer, or between the RLC layer and a medium access control (MAC) layer. However, the embodiment is not limited thereto. The user plane may be split in any layer.

Under the above-mentioned communication state using the dual connectivity, it is assumed that the UE 300 moves to a vicinity of the boundary between the macro cells 101-1 and 101-2 at a high speed, as illustrated in FIG. 7. In this case, as illustrated in (2) of FIG. 8, the quality of the radio link between the UE 300 and the master base station 100-1 deteriorates rapidly.

Here, when the master base station 100-1 fails in transmitting an HO command to the mobile station 300, finally, the UE 300 is unavailable to maintain the radio link with the master base station 100-1 and therefore falls into a state unavailable to perform communication using both of the control plane and the user plane.

When the UE 300 is positioned in the small cell 201 as illustrated in FIG. 7 before the communication becomes unavailable, if once the control plane can be handed over to the secondary base station 200, the UE 300 may be available to continue to perform communication using the user plane through the secondary base station 200.

However, when the RRC layer is centralized in the master base station 100 as illustrated in FIG. 4A and the RRC layer of the secondary base station 200 is disabled, it is unavailable to hand over the control plane to the secondary base station 200.

As a result, the master base station 100-1 determines that communication with the UE 300 is unavailable and releases all of the settings of the wireless bearer established between the master base station 100-1 and the UE 300 by the dual connectivity, as illustrated in (3) of FIG. 8. Further, all of data addressed to the UE 300 is discarded with the release of the settings.

After that, as illustrated in (4) of FIG. 8, when the UE 300 moves to a position where it is available to receive radio waves from the macro cell 101-2, the UE 300 tries to reestablish the connection of the RRC layer to the master base station 100-2 to reestablish the control plane. When the control plane is reestablished, it is available to establish the user plane.

Here, when the handover destination of the UE 300 is set to the secondary base station 200 instead of the master base station 100-2, it may be possible to reduce a HO failure rate. However, a path switching is signaled to the core network 400. An example of a signaling is illustrated in FIG. 9.

Figure 9:
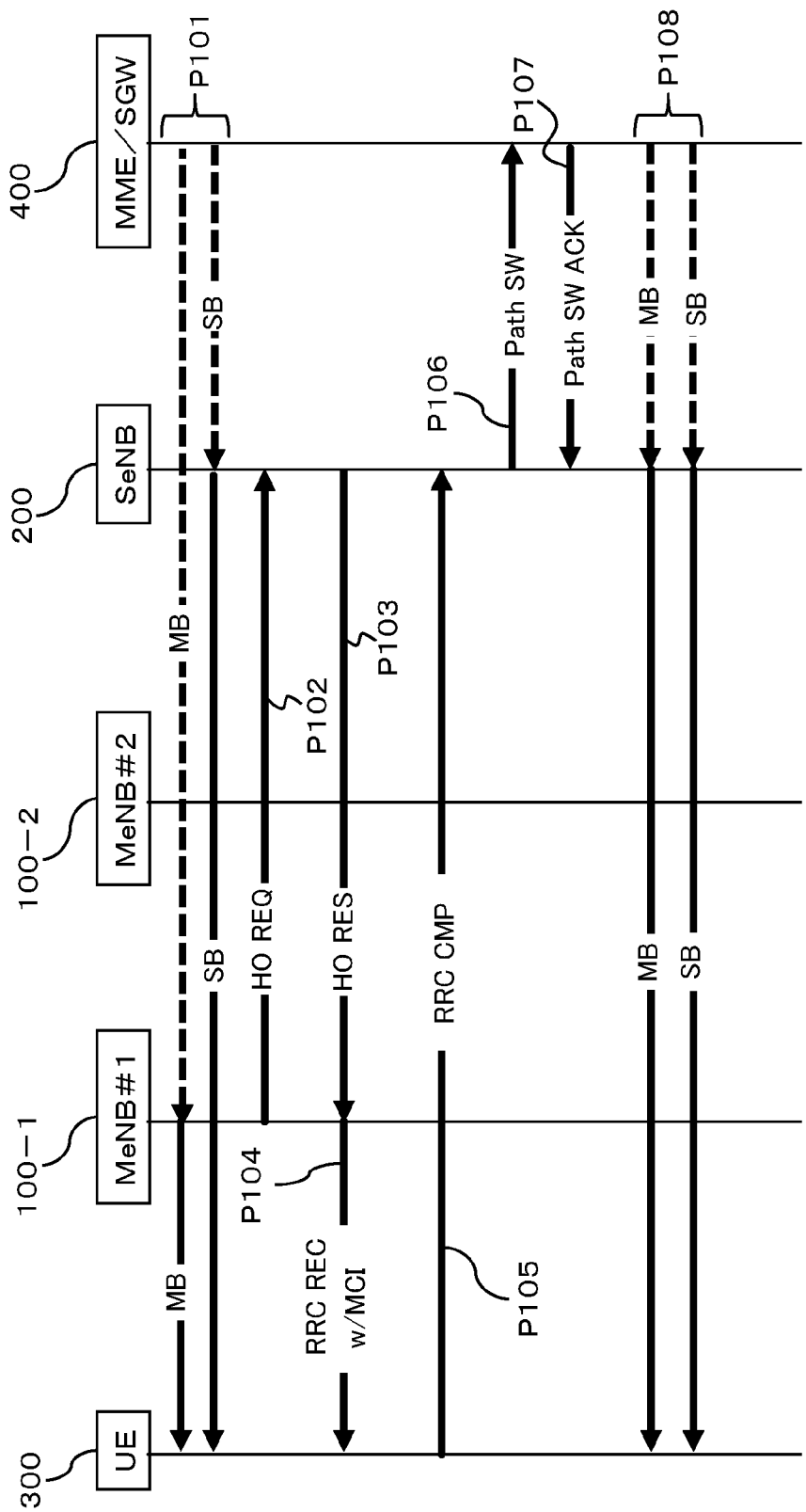
FIG. 9 is a sequence diagram illustrating an example of an operation when the handover destination of the mobile station is set to the secondary base station in the wireless communication system illustrated in FIG. 3.

It is assumed that data is transmitted from the core network (MME/SGW) 400 to the UE 300 through both of an MB that is routed through the master base station 100-1 and an SB that is routed through the secondary base station 100-2 in the dual connectivity, as illustrated in FIG. 9 (Process P101).

Under this assumptive state, when the master base station 100-1 detects a deterioration of the radio link with the UE 300 and determines to perform handover, the master base station 100-1 transmits an HO request (HO REQ) to the secondary base station 200 (Process P102).

Upon receiving the HO request, the secondary base station 200 performs preparation for HO, such as settings required for communication with the UE 300, as an HO destination base station. The "HO destination base station" may be referred to as a "target base station". When the preparation for HO is completed, the secondary base station 200 transmits an HO response (HO RES) to the master base station 100-1 which is an HO originated base station (Process P103). The "HO originated base station" may be referred to as a "source base station". The HO response may include an information element enable the UE 300 to identify the target base station 200.

Upon receiving the HO response from the secondary base station 200, the master base station 100-1 transmits an HO command to the UE 300 (Process P104). A RRC reconfiguration (RRC REC) message is applicable to the HO command. The RRC reconfiguration message may include mobility control information (MCI). The MCI may include an information element available to identify the target base station 200.

Upon receiving the HO command from the master base station 100-1, the UE 300 transmits an HO completion (RRC CMP) message to the secondary base station 200 which is a target base station (Process P105).

Upon receiving the HO completion message from the mobile station 300, the secondary base station 200 transmits (signals) a path switching request to the core network (MME/SGW) 400 (Process P106).

Upon receiving the signaling for path switching from the secondary base station 200, the MME/SGW 400 switches the connection of the MB that has been connected to the master base station 100-1 to the secondary base station 200. In response to a completion of the path switching, the MME/SGW 400 transmits a path switching acknowledgement message (Path SW ACK) to the secondary base station 200 (Process P107).

Thereby, the data addressed to the UE 300 is transmitted to the UE 300 via the MB and the SB that are routed through the secondary base station 200 (Process P108).

In this way, when the handover destination of the UE 300 is set to the secondary base station 200 and the UE 300 is simply handed over from the master base station 100-1 to the secondary base station 200, transmissions of signals related to path switching for the core network 400 are occurred.

Figure 10:
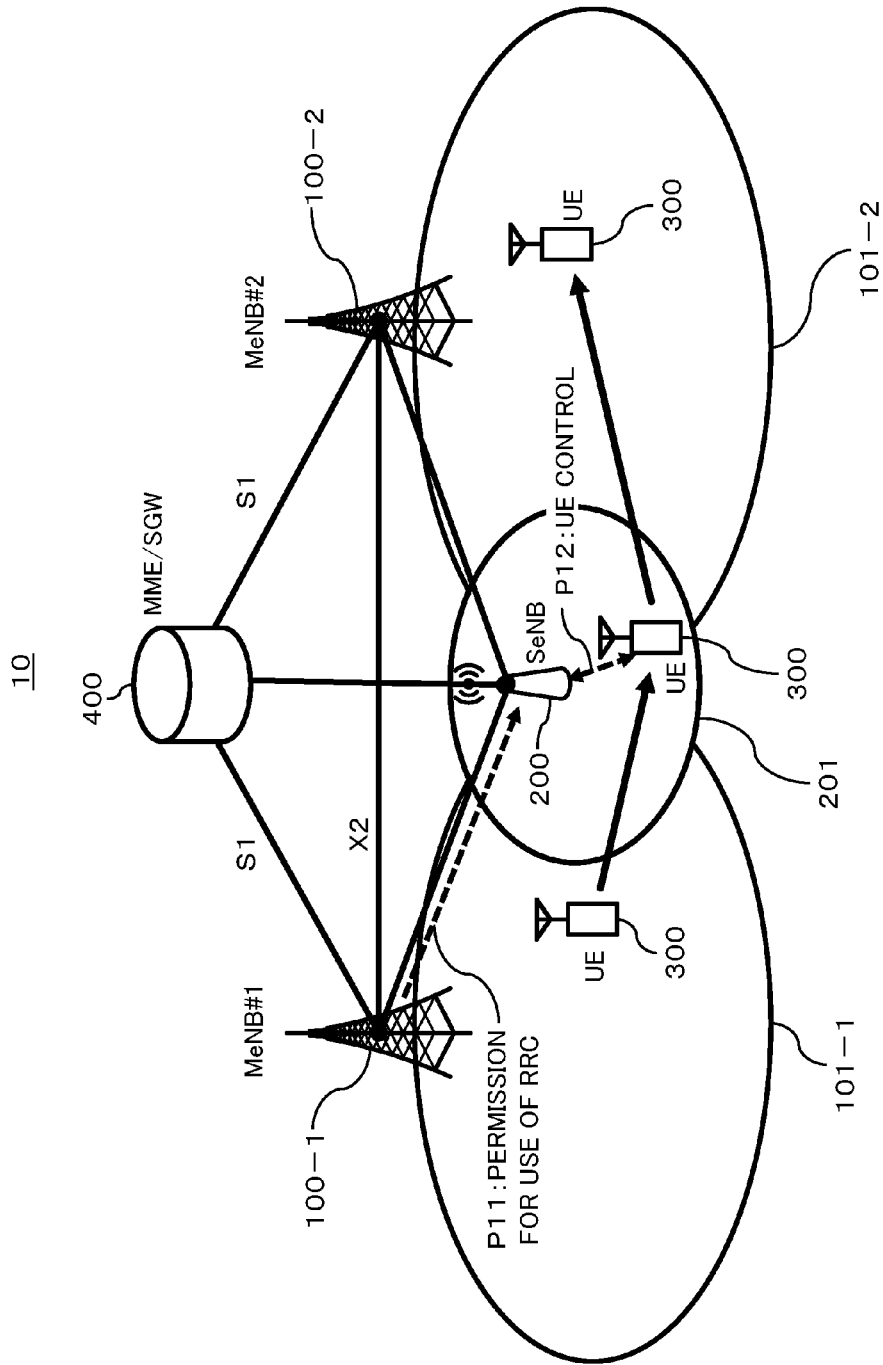
FIG. 10 is a diagram illustrating wireless communication control according to the first embodiment.

Therefore, this is unmatched (contrary) to a concept that, even in an environment in which the small cell 201 is provided in the macro cell 101, HO is limited into the inter-macro cells 101 to minimize signaling to the core network 400.

in view of the above, in this embodiment, as illustrated in FIG. 10, the master base station 100 permits the secondary base station 200 to use the RRC layer temporarily or as usual (Process P11). The secondary base station 200 that has received the permission may control an RRC layer which processes a control plane signal between the secondary base station 200 and the UE 300 (Process P12).

Therefore, the secondary base station 200 is available to (directly) transmit an HO command to the UE 300 alternative to the master base station 100 which is a handover source. The UE 300 can receive the HO command transmitted by the secondary base station 200.

In this way, the master base station 100 of an HO source is available to hand over the processing of the control plane to the secondary base station 200. Therefore, the secondary base station 200 is possible to try to reestablish the connection over the control plane (RRC) to the UE 300 while maintaining an SB of the user plane between the secondary base station 200 and the UE 300. Further, the secondary base station 200 is unnecessary to transceive signals for path switching with the core network 400.

Figure 11:
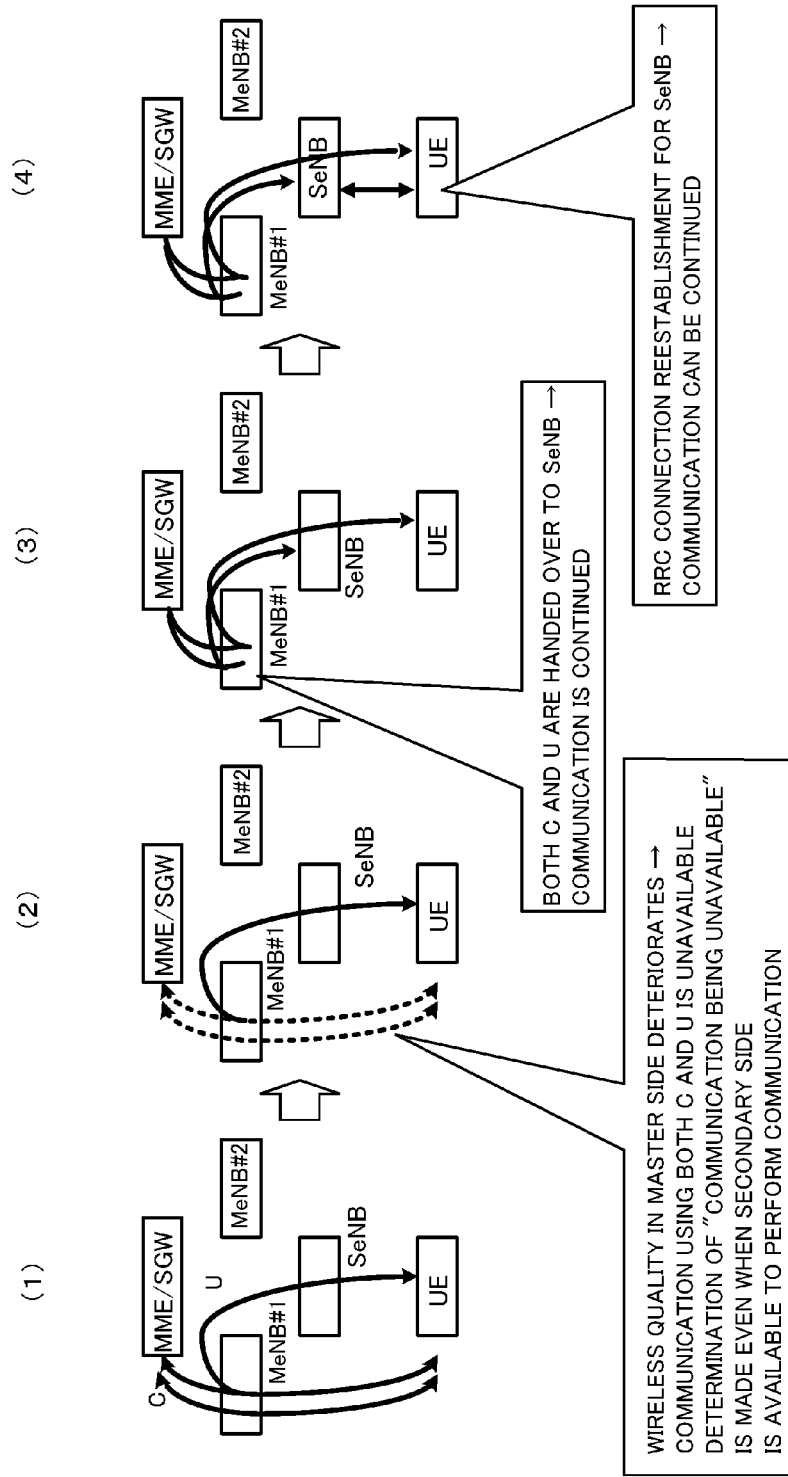
FIG. 11 is a diagram illustrating the wireless communication control according to the first embodiment.

For example, it is assumed that the UE 300 is connected to both of the master base station 100-1 and the secondary base station 100-2 by the dual connectivity, and performs communication using the control plane and the user plane, as illustrated in (1) of FIG. 11.

Further, it is assumed that, under this communication state using the dual connectivity, the UE 300 moves to a vicinity of the boundary between the macro cells 101-1 and 101-2 at a high speed, as illustrated in FIG. 10. In this case, as illustrated in (2) of FIG. 11, a quality of the radio link between the UE 300 and the master base station 100-1 deteriorates rapidly.

When the master base station 100-1 detects the deterioration of the quality of the radio link between the UE 300 and the master base station 100-1, the master base station 100-1 permits the secondary base station 200 to use the RRC layer and hands over the control plane and the user plane to the secondary base station 200, as illustrated in (3) of FIG. 11. Then, as illustrated in (4) of FIG. 11, the secondary base station 200 that has been permitted to use the RRC layer controls the connection over the control plane to the UE 300.

In this way, since the connection with the secondary base station 200 through the user plane is not disconnected, the UE 300 is available to continue to perform data communication through the secondary base station 200 even when the radio link between the UE 300 and the master base station 100 is disconnected.

Accordingly, it is possible to reduce delay in data communication, as compared to the case where the radio link (the control plane and the user plane) is connected all over again, as illustrated in FIG. 6 or FIG. 8. In addition, it is possible to prevent the data of the user plane from being discarded.

Further, the secondary base station 200 is unnecessary to transmit a signal for path switching to the core network 400. Therefore, it is possible to prevent an increase in overhead caused by signaling to the core network 400.

Furthermore, since it is possible to achieve an efficient use of the secondary base station 200 (small cell 201), it is possible to distribute communication load and to achieve an efficient operation of the wireless communication system 10.

As a whole, it is possible to improve communication performance or characteristics of the wireless communication system 10.

In the above-mentioned example, the expression of "permit to use the RRC layer" is used. However, for example, the expression of "start (or activate) the RRC layer" or "validate (or enable) the RRC layer" may also be used.

Upon receiving control information indicative of permission, activation, or enabling from the master base station 100, the secondary base station 200 may start processing the RRC layer and start control for the connection over the control plane to the UE 300.

Figure 12:
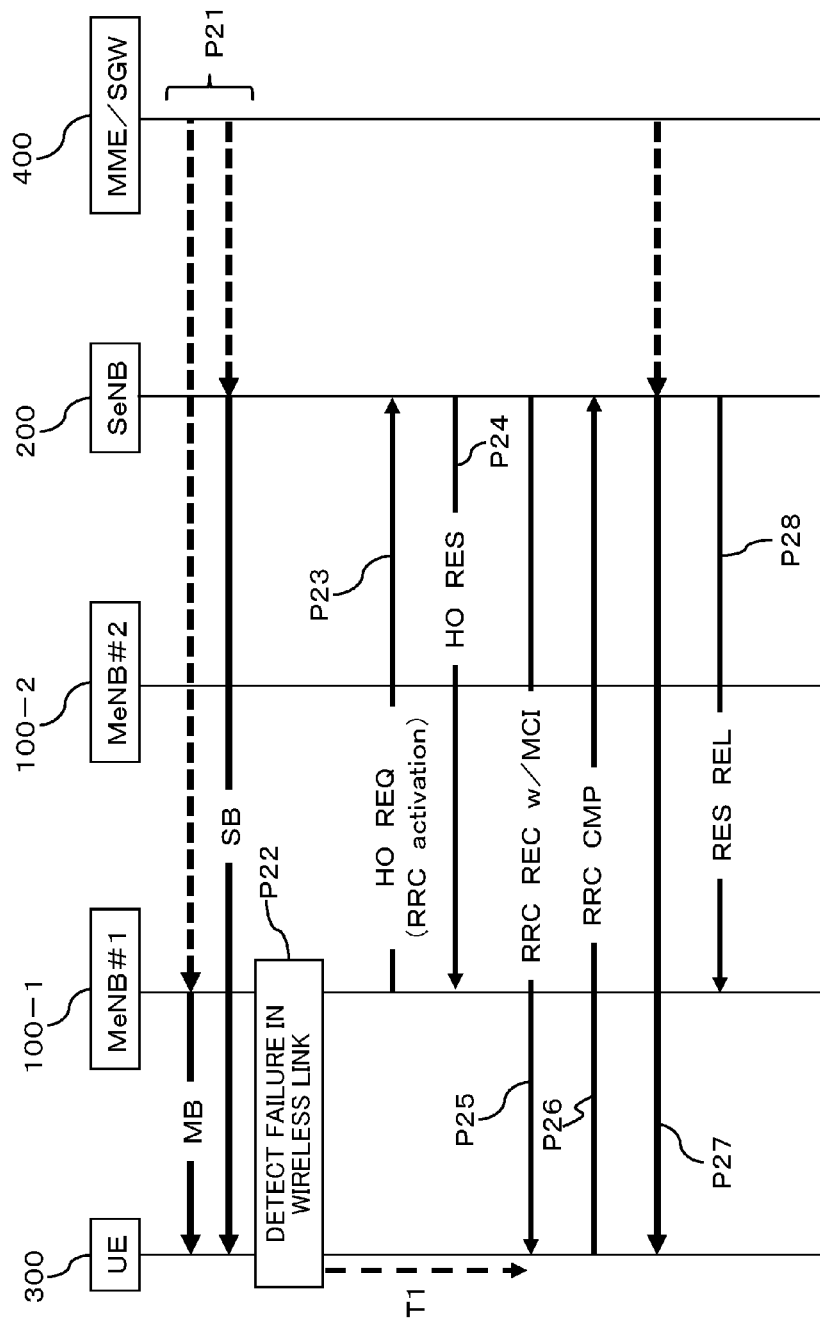
FIG. 12 is a sequence diagram illustrating an example of the wireless communication control according to the first embodiment.

Next, FIG. 12 illustrates an example of a sequence to achieve the above-mentioned process using FIGS. 10 and 11. As illustrated in FIG. 12, it is assumed that data is transmitted from the core network (MME/SGW) 400 to the UE 300 through both of an MB that is routed through the master base station 100-1 and an SB that is routed through the secondary base station 100-2 in the dual connectivity (Process P21).

Under this state, when the master base station 100-1 detects the deterioration of the quality of the radio link to the UE 300 (Process P22) and determines to perform an HO, the master base station 100-1 transmits an HO request (HO REQ) to the secondary base station 200 (Process P23). The deterioration of the quality may be detected by comparing the quality of the radio link with a predetermined quality threshold value. The deterioration of the quality of the radio link may be referred to as a radio problem.

The master base station 100-1 may include control information indicating that the connection control of the control plane by the RRC layer may start into the HO request to be transmitted to the secondary base station 200. In FIG. 12, the control information is represented by "RRC activation", for example. Hereinafter, it is assumed that information explicitly indicating "RRC activation" is transmitted. However, it may be considered that a standard HO request corresponds to the control information. In this case, the "RRC activation" may be unattached to the HO request.

The control information indicative of "RRC activation" may be transmitted from the master base station 100 to the secondary base station 200, separately from the HO request. However, by including the control information indicative of "RRC activation" into the HO request, it is possible to reduce delay in the HO process.

Upon receiving the HO request including the "RRC activation", the secondary base station 200 recognizes that the secondary base station 200 is set to the HO destination base station (target base station) of the UE 300. In addition, upon receiving the "RRC activation", the secondary base station 200 recognizes that the use of the RRC layer is permitted.

Thereby, the secondary base station 200 performs preparation for handover, such as settings required for communication with the UE 300, as a target base station and becomes in a state available to control the connection over the control plane using the RRC layer. Therefore, the secondary base station 200 becomes in a state available to transmit a message (for example, an HO command) of the RRC layer to the UE 300.

When the preparation for HO is completed, the secondary base station 200 transmits an HO response (HO RES) to the master base station 100-1 that is an HO source base station (Process P24). The HO response may be considered as an acknowledgement message for the reception of the "RRC activation". Alternatively, an information element corresponding to the acknowledgement message may be explicitly included into the HO response.

After transmitting the HO response, the secondary base station 200 processes the RRC layer to transmit an HO command to the UE 300 (Process P25). An RRC reconfiguration (RRC REC) message is applicable to the HO command. The RRC reconfiguration message may include mobility control information (MCI). The MCI may include an information element available to identify the secondary base station 200 that is a target base station.

When the UE 300 successfully receives the HO command transmitted by the secondary base station 200, the UE 300 transmits an RRC layer connection completion (RRC CMP) message to the secondary base station 200 (Process P26). The secondary base station 200 may increase the frequency of transmission of the HO command or may increase the transmission power of the HO command in order to improve a success rate in receiving the HO command at the UE 300.

Upon receiving the RRC layer connection completion message from the UE 300 by the secondary base station 200, a connection (RRC connection) over the control plane for the UE 300 is successfully established. Therefore, the secondary base station 200 is possible to continue to transmit the data, which has been transmitted to the UE 300 through the SB in Process P21, to the UE 300 while maintaining the SB (without disconnecting the SB) (Process P27).

Upon establishing the connection over the control plane for the UE 300 successfully, the secondary base station 200 may transmit a resource release (RES REL) message to the master base station 100-1 that is an HO source base station (Process P28). Upon receiving the resource release message from the secondary base station 200, the master base station 100-1 may release, for example, the allocation of the radio resources used for communication with the UE 300.

When the secondary base station 200 detects that the UE 300 departs from the small cell 201 formed by the secondary base station 200, the secondary base station 200 may end the use of the RRC layer which has been permitted to be used. For example, the secondary base station 200 may detect that the reception power of a signal from the UE 300 is less than a predetermined power threshold value to detect that the UE 300 departs from the small cell 201.

In response to the detection of the UE 300 departing from the small cell 201, for example, the secondary base station 200 may notify that the UE 300 has departed from the small cell 201 to the master base station 100, which has transmitted the signal indicative of permission for use of the RRC layer. Upon receiving the notification, the master base station 100 may transmit control information to the secondary base station 200 to control the RRC layer to a stop, prohibited, disabled, or sleep state.

Alternatively, when the secondary base station 200 detects that the UE 300 departs from the small cell 201, the secondary base station 200 may autonomously control the RRC layer to a stop, prohibited, disabled, or sleep state. The secondary base station 200 may transmit information indicative of a fact that the state of the RRC layer in the secondary base station 200 has autonomously controlled to the master base station 100 that is the transmission source of permission for use of the RRC layer.

For example, the transmission of the HO request (Process P23) illustrated in FIG. 12 may be performed for a time period from a timing when the master base station 100-1 detects the deterioration of the quality of the radio link to the UE 300 to a timing when an occurrence of an RLF is determined (detected). The "deterioration of the quality of the radio link" may be referred to as a "radio link failure (radio problem)".

Figure 13:
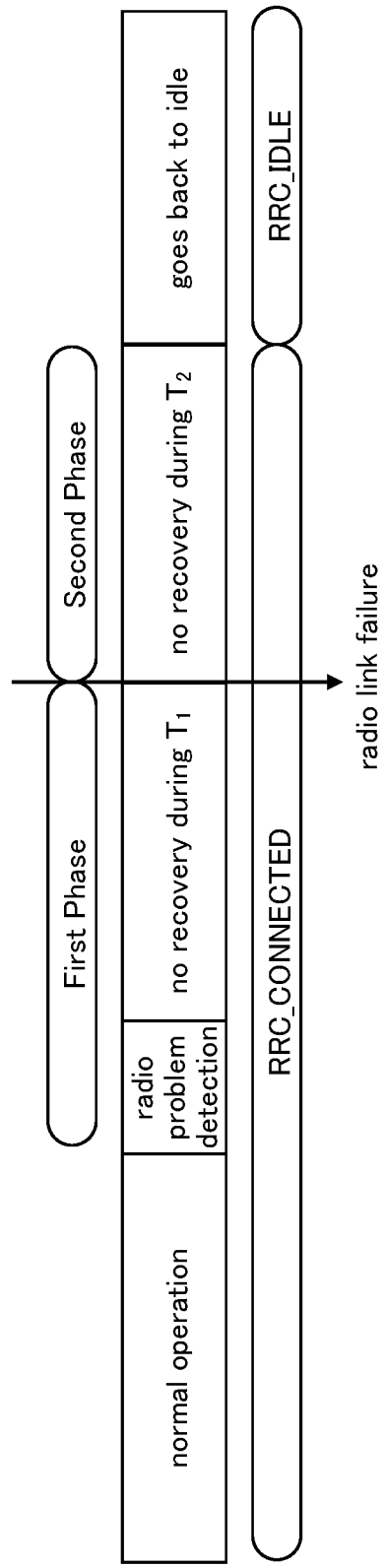
FIG. 13 is a diagram illustrating a first phase and a second phase which are related to a radio link failure (RLF) defined in 3GPP.

The time period is defined as a "first phase" in 3GGP (TS36.300 Section 10.1.6), as illustrated in FIG. 13. For the first phase, a $T_1$ timer that counts a time $T_1$ elapsed since a radio link failure has been detected is provided. When the connection of the RRC layer is not recovered even when the $T_1$ timer expires, an RLF is detected.

Before the $T_1$ timer expires, the master base station 100 transmits an HO request including information indicative of permission for use of the RRC layer to the secondary base station 200. Therefore, the UE 300 is possible to be reliably handed over to the secondary base station 200 before an RLF is detected.

In FIG. 13, when an RLF is detected, a change from the first phase to a second phase is occurred. For the second phase, a $T_2$ timer that counts a time $T_2$ elapsed since the RLF has been detected is provided. When the connection of the RRC layer is not recovered even when the $T_2$ timer expires, the RRC layer becomes an idle state.

First Modification Example of First Embodiment

In a case where a wireless base station stores and manages context information (hereinafter, may also be referred to as "UE context") of the UE 300, the UE 300 is available to establish a radio link with the wireless base station. Therefore, the UE 300 is available to be handed over to the wireless base station. The UE context may include identification information (ID) of the UE 300 or information used for security authentication with the wireless base station, for example.

The UE context may be considered as minimum information for the UE 300 to establish a radio link with the wireless base station to start communication. For example, information indicative of communication capability (for example, UE capability and a memory size) of the UE 300 may correspond to the UE context.

Therefore, for example, when the master base station 100 transmits the UE context of the UE 300 to the secondary base station 200 in response to a determination of the HO of the UE 300, the UE 300 can try to reestablish the connection of the RRC layer (control plane) with the secondary base station 200.

Figure 14:
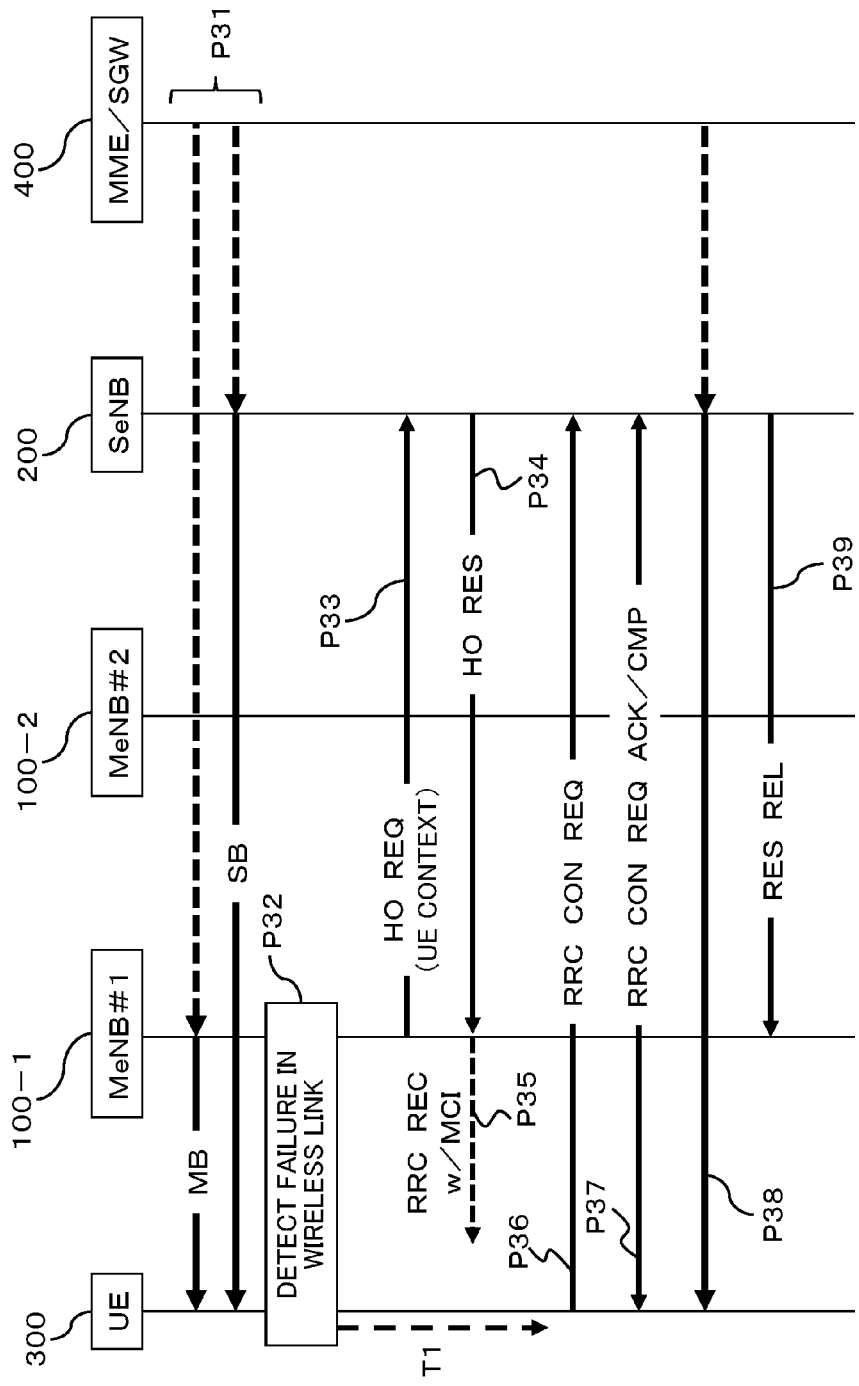
FIG. 14 is a sequence diagram illustrating an example of wireless communication control according to a first modification example of the first embodiment.

FIG. 14 illustrates an example of a sequence of the connection reestablishment of the RRC layer from the UE 300 with the secondary base station 200. As illustrated in FIG. 14, it is assumed that data is transmitted from the core network (MME/SGW) 400 to the UE 300 through both of an MB is routed through the master base station 100-1 and an SB that is routed through the secondary base station 100-2 in the dual connectivity (Process P31).

Under this state, when the master base station 100-1 detects a failure in the radio link with the UE 300 (Process P32) and determines to perform an HO, the master base station 100-1 transmits an HO request (HO REQ) to the secondary base station 200 (Process P33).

The master base station 100-1 may include the UE context of the UE 300 which is an HO target into the HO request addressed to the secondary base station 200. The HO request may include control information indicative of the aforementioned "RRC activation" together with the UE context.

The UE context may be transmitted from the master base station 100 to the secondary base station 200, separately from the HO request. However, when the UE context is included in the HO request, it is possible to reduce delay in the HO process. The HO request including the UE context may be transmitted before the $T_1$ timer illustrated in FIG. 13 expires, as similarly to the example illustrated in FIG. 12.

Upon receiving the HO request including the UE context, the secondary base station 200 recognizes that the secondary base station 200 is set as the HO destination base station (target base station) of the UE 300. In addition, with receiving the UE context, the secondary base station 200 may recognize that the use of the RRC layer for the UE 300 has been permitted.

In other words, the UE context may be served as the control information indicative of the aforementioned "RRC activation". However, the control information indicative of the "RRC activation" may be explicitly set in the HO request, separately from the UE context.

In response to a reception of the HO request, the secondary base station 200 performs preparation for an HO, such as settings required for communication with the UE 300, as the target base station. Further, the secondary base station 200 becomes in a state in which a connection control over the control plane using the RRC layer for the UE 300 is available. Therefore, the secondary base station 200 is in a state where an RRC layer connection request from the UE 300 is receivable, for example.

When the preparation for the HO is completed, the secondary base station 200 transmits an HO response (HO RES) to the master base station 100-1 that is an HO source base station (Process P34). The HO response may be considered as an acknowledgement message for the reception of the UE context and the "RRC activation". Alternatively, an information element corresponding to the acknowledgement message may be explicitly included into the HO response.

Upon receiving the HO response from the secondary base station 200, the master base station 100-1 may transmit an HO command to the UE 300 (Process P35). An RRC reconfiguration (RRC REC) message is applicable to the HO command. The RRC reconfiguration message may include MCI. The MCI may include an information element available to identify the secondary base station 200 that is the target base station.

Here, it is assumed that the UE 300 failed in receiving the HO command transmitted from the master base station 100-1. For example, when the UE 300 fails in successfully receiving the HO command even when a predetermined period of time has elapsed, the UE 300 may autonomously try to connect the RRC layer to the secondary base station 200. For example, the UE 300 may transmit an RRC layer connection request (RRC CON REQ) message to the secondary base station 200 (Process P36).

Since the secondary base station 200 has already received the UE context, the secondary base station 200 is in a state in which the RRC layer connection request message transmitted from the UE 300 can be successfully received. Upon receiving the RRC layer connection request message, the secondary base station 200 transmits an acknowledgement (RRC CON REQ ACK) message to the UE 300, for example. Upon receiving the acknowledgement message, the UE 300 transmits an RRC layer connection request completion (RRC CON REQ CMP) message to the secondary base station 200 (Process P37), for example.

Upon receiving the RRC layer connection request completion message from the UE 300 by the secondary base station 200, a connection over the control plane (RRC connection) for the UE 300 is successfully established. Therefore, the secondary base station 200 is possible to continue to transmit the data, which has been transmitted to the UE 300 through the SB in Process P31, to the UE 300 while maintaining the SB (without disconnecting the SB) (Process P38).

Upon establishing the connection over the control plane for the UE 300 successfully, the secondary base station 200 may transmit a resource release (RES REL) message to the master base station 100-1 that is an HO source base station (Process P39). Upon receiving the resource release message from the secondary base station 200, the master base station 100-1 may release the allocation of the radio resources that have been used for communication with the UE 300, for example.

As described above, according to the first modification example, the master base station 100-1 transfers the UE context of the UE 300, which is an HO target, to the secondary base station 200 and permits the secondary base station 200 to control the connection of the RRC layer for the UE 300.

Therefore, even when the UE 300 fails in receiving the HO command from the master base station 100-1, the UE 300 autonomously tries to (or takes the initiative in trying to) connect the RRC layer to the secondary base station 200. Therefore, it is possible to reestablish the connection of the RRC layer.

The UE 300 may increase the frequency of transmission of the connection request message or the transmission power of the connection request message in order to improve a success rate in receiving the RRC layer connection request message at the secondary base station 200.

In response to a detection of the UE 300 departing from the small cell 201, for example, the secondary base station 200 may notify that the UE 300 has departed from the small cell 201 to the master base station 100 that is a transfer source of the UE context of the RRC layer. Upon receiving the notification, the master base station 100 transmits control information to the secondary base station 200 to control the use of the RRC layer such that the RRC layer is in a stop, prohibited, disabled, or sleep state.

Alternatively, upon detecting that the UE 300 departs from the small cell 201, the secondary base station 200 may autonomously control the use of the RRC layer such that the RRC layer is in a stop, prohibited, disabled, or sleep state. The secondary base station 200 may transmit information indicating that the state of the RRC layer has autonomously been controlled, to the master base station 100 that is a source of the permission for usage.

In response to the detection of the UE 300 departing from the small cell 201, the secondary base station 200 may discard the UE context received from the master base station 100. The UE context may be discarded under a control of the master base station 100 or may be discarded by the secondary base station 200 autonomously.

Second Modification Example of First Embodiment

The sequence example described with reference to FIG. 12 and the sequence example described with reference to FIG. 14 may be combined with each other. In other words, the configuration in which the secondary base station 200 takes the initiative in trying to connect the RRC layer for the UE 300 may be combined with the configuration in which the UE 300 takes the initiative in trying to connect the RRC layer for the secondary base station 200. In other words, a combination of the first embodiment and the first modification example of the first embodiment is available.

For example, the secondary base station 200 takes the initiative in trying to connect the RRC layer during the period of the $T_1$ timer illustrated in FIG. 13, and the UE 300 takes the initiative in trying to connect the RRC layer during the period of the $T_2$ timer illustrated in FIG. 13.

Figure 15:
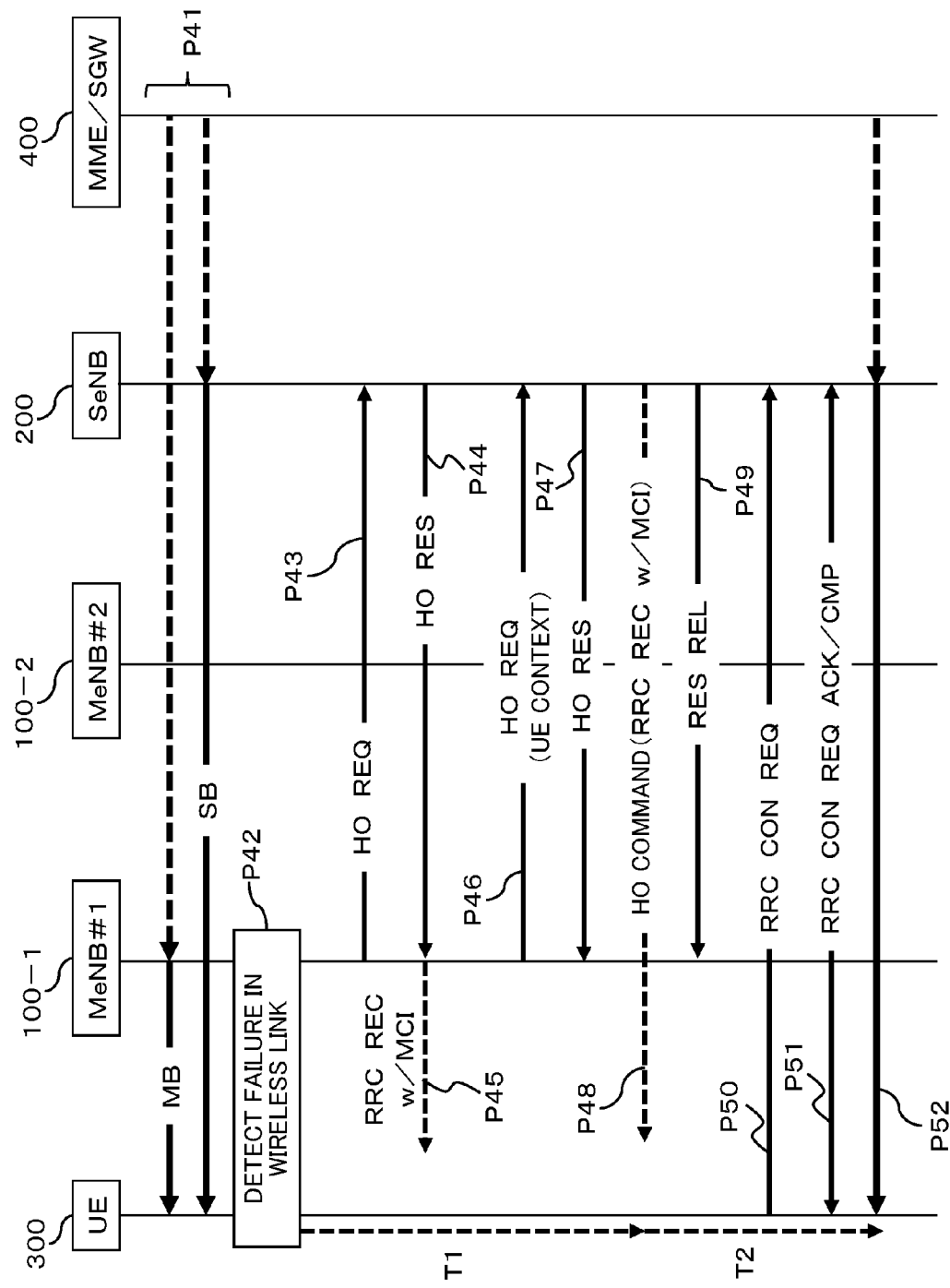
FIG. 15 is a sequence diagram illustrating an example of wireless communication control according to a second modification example of the first embodiment.

FIG. 15 illustrates an example of a sequence of the above combination. As illustrated in FIG. 15, it is assumed that data is transmitted from the core network (MME/SGW) 400 to the UE 300 both of an MB that is routed through the master base station 100-1 and an SB that is routed through the secondary base station 100-2 in the dual connectivity (Process P41).

Under this state, when the master base station 100-1 detects a failure in the radio link to the UE 300 (Process P42) and determines to perform a handover, the master base station 100-1 transmits an HO request to the secondary base station 200 (Process P43).

Upon receiving the HO request from the master base station 100-1, the secondary base station 200 transmits the HO response to the master base station 100-1 (Process P44). Upon receiving the HO response from the secondary base station 200, the master base station 100-1 transmits an HO command to the UE 300 (Process P45).

Here, it is assumed that the UE 300 has failed in receiving the HO command. When an RRC layer connection completion message is not received from the UE 300 for a predetermined period of time, the master base station 100-1 transmits the HO request to the secondary base station 200 again in the period of the $T_1$ timer (Process P46). The master base station 100-1 may include a UE context into the HO request.

Upon receiving the HO request including the UE context, the secondary base station 200 recognizes that the use of the RRC layer for the UE 300 has been permitted. Thereby, the secondary base station 200 becomes in a state in which a control of a connection over the control plane using the RRC layer for the UE 300 is available. Therefore, the secondary base station 200 is available to transmit the HO command to the UE 300.

The secondary base station 200 transmits an HO response as an acknowledgement for the received HO request to the master base station 100-1 (Process P47) and performs processes on the RRC layer for the UE 300 to transmit the HO command to the UE 300 (Process P48).

Here, it is assumed that the $T_1$ timer expires and an RLF is detected in the secondary base station 200 because the UE 300 fails in receiving the HO command. In this case, the secondary base station 200 starts counting the time $T_2$ by the $T_2$ timer. In response to a detection of the RLF, the secondary base station 200 may transmit a resource release message to the master base station 100-1 (Process P49).

Upon receiving the resource release message from the secondary base station 200, the master base station 100-1 releases an allocation of radio resources that have been used for communication with the UE 300, for example.

Meanwhile, the UE 300 may try to reestablish the connection of the RRC layer for the secondary base station 200 during the period of the $T_2$ timer after the RLF is detected. For example, the UE 300 may transmit an RRC layer connection request message to the secondary base station 200 (Process P50).

Since the secondary base station 200 has already received the UE context, the secondary base station 200 is in a state in which the RRC layer connection request message transmitted from the UE 300 can be received successfully. Upon receiving the RRC layer connection request message, the secondary base station 200 transmits an acknowledgement (RRC CON REQ ACK) message to the UE 300, for example. Upon receiving the acknowledgement message, the UE 300 transmits an RRC layer connection request completion (RRC CON REQ CMP) message to the secondary base station 200, for example (Process P51).

Upon receiving the RRC layer connection request completion message from the UE 300 by the secondary base station 200, the connection over the control plane (RRC connection) for the UE 300 is established successfully. Therefore, the secondary base station 200 is possible to continue to transmit the data, which has been transmitted to the UE 300 through the SB in Process P41, to the UE 300 while maintaining the SB (without disconnecting the SB) (Process P52).

As described above, according to the second modification example, even in a case where an RLF occurs because the UE 300 fails in receiving the HO command for the period of the $T_1$ timer and an RRC connection is released, the UE 300 is possible to take the initiative in trying to reestablish the connection of the RRC layer for the secondary base station 200.

Therefore, it is possible to improve the success rate in the connection of the RRC layer between the UE 300 and the secondary base station 200 in addition to the same technical advantage as that in the aforementioned embodiment and the first modification example.

In order to improve a success rate at the UE 300 in receiving the HO command transmitted in Process P48, the secondary base station 200 may increase the frequency of transmission or the transmission power of the HO command.

Further, in order to improve a success rate at the secondary base station 200 in receiving the RRC layer connection request message transmitted in Process P50, the UE 300 may increase the frequency of transmission or the transmission power of the connection request message.

A process to be performed in a case where the UE 300 departs from the small cell 201 may be the same as the aforementioned process.

Contrary to the example illustrated in FIG. 15, the UE 300 may take the initiative in trying to connect the RRC layer during the period of the $T_1$ timer, and the secondary base station 200 may take the initiative in trying to connect the RRC layer during the period of the $T_2$ timer.

Third Modification Example of First Embodiment

In the first modification example of the first embodiment, it is assumed that the UE context is transmitted to the secondary base station 200 in response to the determination of HO. However, the fact in which the multiple access is performed may be considered as a case where the secondary base station 200 holds the UE context.

For example, when the setting of the multiple access is performed, the master base station 100 may transmit the UE context to the secondary base station 200. In this case, the UE context may be unnecessary to be included in the HO request as in the first modification example of the first embodiment.

The third modification example can be performed in a combination with any one of the first embodiment and the first and second modification examples of the first embodiment.

Second Embodiment

In the first embodiment and each modification example of the first embodiment, with the HO of the UE 300, the secondary base station 200 that has received a permission for use of the RRC layer from the master base station 100 directly transmits the HO command to the UE 300. In other words, the secondary base station 200 that has received a permission for use of the RRC layer directly controls the RRC connection with the UE 300.

In contrast, in a second embodiment, an example in which, with the HO of the UE 300, the secondary base station 200 that has received a permission for use of the RRC layer takes the initiative in enabling the master base station 100 to transmit the HO command addressed to the UE 300 will be described.

In other words, an example in which the secondary base station 200 that has received a permission for use of the RRC layer indirectly controls the RRC connection with the UE 300 through the master base station 100 will be described. As such, an example in which the secondary base station 200 takes the initiative in controlling the HO of the UE 300 may be referred to as "SeNB initiated handover".

The second embodiment may be considered as an embodied example of the content described in the "General Outline". Therefore, of course, this embodiment may be made in combination with the content described in "General Outline". Further, the second embodiment may be combined with the first embodiment including the first to third modification examples.

For example, the secondary base station 200 that has received a permission for use of the RRC layer may determine and decide whether to perform the operation according to the first embodiment or the operation according to the second embodiment, and may perform the decided operation.

Figure 16:
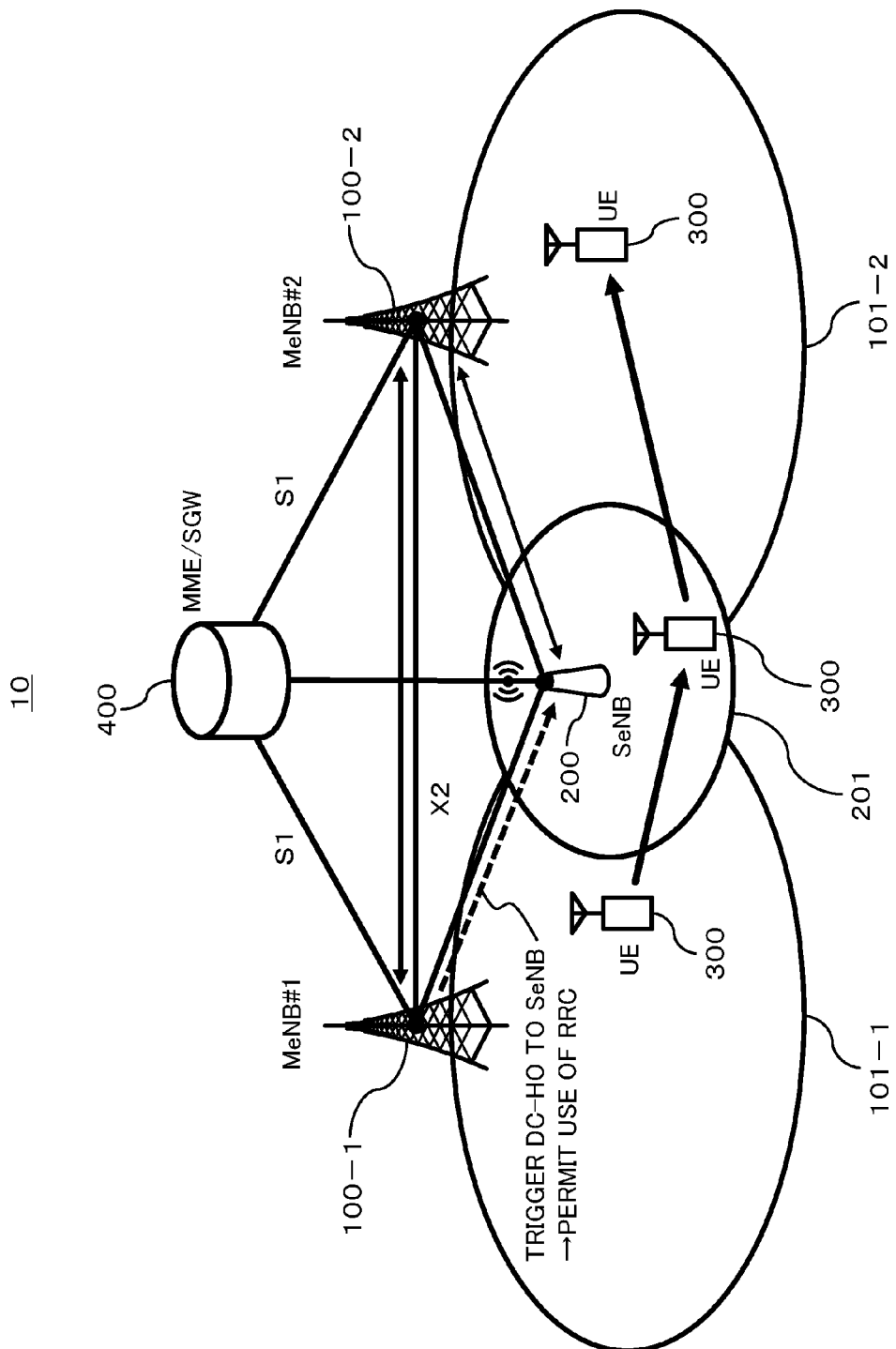
FIG. 16 is a diagram illustrating wireless communication control in a wireless communication system according to a second embodiment.

In the second embodiment, for example, it is assumed that the UE 300 which is connected to the macro cell 101-1 and the small cell 201 by the dual connectivity (DC) moves (is handed over) from the macro cell 101-1 to another macro cell 101-2, as illustrated in FIG. 16.

In this case, in the dual connectivity between the cells and the UE 300, the connection (RRC connection) over the control plane changes from the macro cell 101-1 to the macro cell 101-2 while the connection over the user plane to the small cell 201 is maintained. Such HO in the dual-connectivity may be referred to as "DC-HO".

Upon performing the DC-HO, the master base station 100-1 that is a source base station gives a DC-HO trigger to the secondary base station 200 and permits the secondary base station 200 to use the RRC layer. The secondary base station 200 that has received a permission for use of the RRC layer becomes available to transceive an RRC layer message with a target base station 100-2. Therefore, the secondary base station 200 becomes available to control the RRC connection for the UE 300 by the target base station 100-2.

Figure 17:
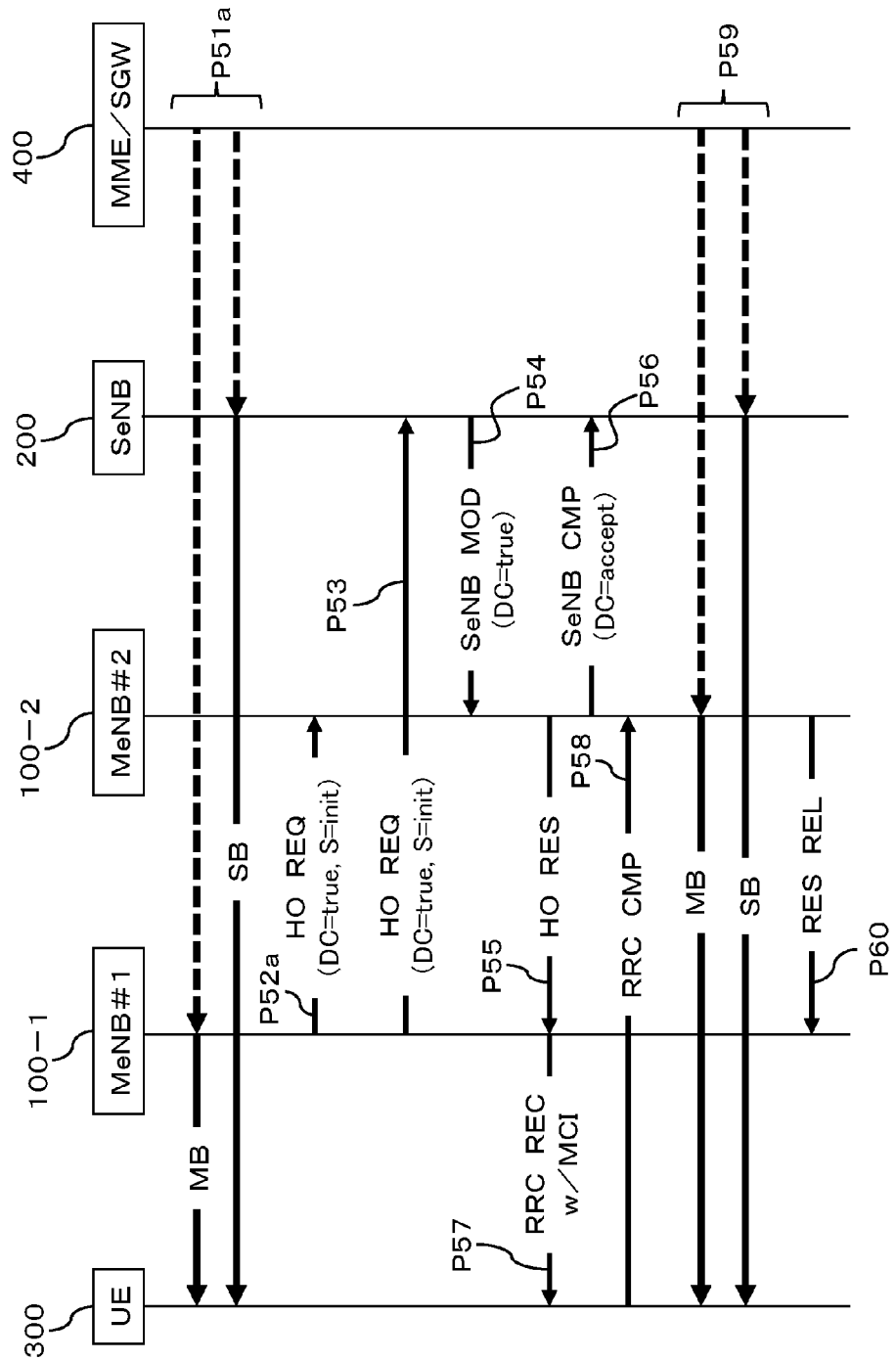
FIG. 17 is a sequence diagram illustrating an example of the wireless communication control according to the second embodiment.

FIG. 17 illustrates an example of a DC-HO sequence according to the second embodiment. As illustrated in FIG. 17, before the DC-HO is performed, the UE 300 receives a control plane signal from the master base station 100-1 through an MB and receives a user plane signal from the secondary base station 200 through an SB (Process P51a).

Thereafter, when the UE 300 moves away from the master base station 100-1 to another macro cell 101-2, the master base station 100-1 determines to perform the DC-HO. Then, the master base station 100-1 transmits an HO request to the master base station 100-2 in the macro cell 101-2 that is a DC-HO target and the secondary base station 200 (Processes P52a and P53).

The HO request may include information (DC=true) indicative of a DC-HO trigger and information (S=init) indicative of permitting the secondary base station 200 to use the RRC layer, for example.

The "DC=true" is a conceptual or expedient representation of information serving as a DC-HO trigger. In practice, the information may be represented in various ways. For example, the information may be an identifier of the secondary bearer, an identifier of the corresponding core network, information about a layer-2 (L2) entity, or a logical channel identifier. Examples of the L2 entity may include a PDCP entity, an RLC entity, and a MAC entity.

Upon receiving the HO request (DC=true, S=init) from the source base station 100-1, the master base station 100-2 serving as a DC-HO target base station recognizes that the master base station 100-2 serves as a target base station. Further, the target base station 100-2 recognizes that possibility of receiving a message indicative of maintaining or releasing (DC=true or release) the dual connectivity from the secondary base station 200 that is permitted to use the RRC layer.

Meanwhile, when the secondary base station 200 receives the HO request (DC=true, S=init) from the source base station 100-1, DC-HO is triggered and the secondary base station 200 becomes in a state available to use the RRC layer. Then, the secondary base station 200 transmits an RRC layer message (SeNB MOD) indicative of maintaining the dual connectivity (DC=true) to the target base station 100-2 (Process P54).

Upon receiving the message, the target base station 100-2 transmits an HO response to the source base station 100-1 (Process P55). Further, the target base station 100-2 transmits an RRC layer message (SeNB CMP) indicative of a reception of the maintaining of the dual connectivity to the secondary base station 200 (Process P56). The order of Process P55 and Process P56 is exchangeable.

Meanwhile, the source base station 100-1 that has received the HO response from the target base station 100-2 transmits an HO command to the UE 300 (Process P57). Upon receiving the HO command, the UE 300 transmits an RRC layer message (RRC CMP) indicative of the completion of an RRC connection with the target base station 100-2 (Process P58).

With receiving the message from the UE 300 by the target base station 100-2, an RRC connection is established between the target base station 100-2 and the UE 300. In other words, the connection source of the MB for the UE 300 is changed from the source base station 100-1 to the target base station 100-2.

Thereafter, the UE 300 receives a control plane signal from the target base station 100-2 and receives a user plane signal from the secondary base station 200 (Process P59). The target base station 100-2 that has received a message indicative of the completion of the RRC connection may transmit a resource release (RES REL) message to the source base station 200-1 (Process P60).

Upon receiving the resource release message from the target base station 100-2, the source base station 100-1 may release the allocation of the radio resources that have been used for communication with the UE 300, for example. The resource release message may be transmitted between Process P58 and Process P59.

In this way, upon performing the DC-HO, the secondary base station 200 that has received a permission for use of the RRC layer from the source base station 100-1 takes the initiative in controlling the connection (RRC connection) of the control plane in the dual connectivity to the UE 300.

Figure 19:
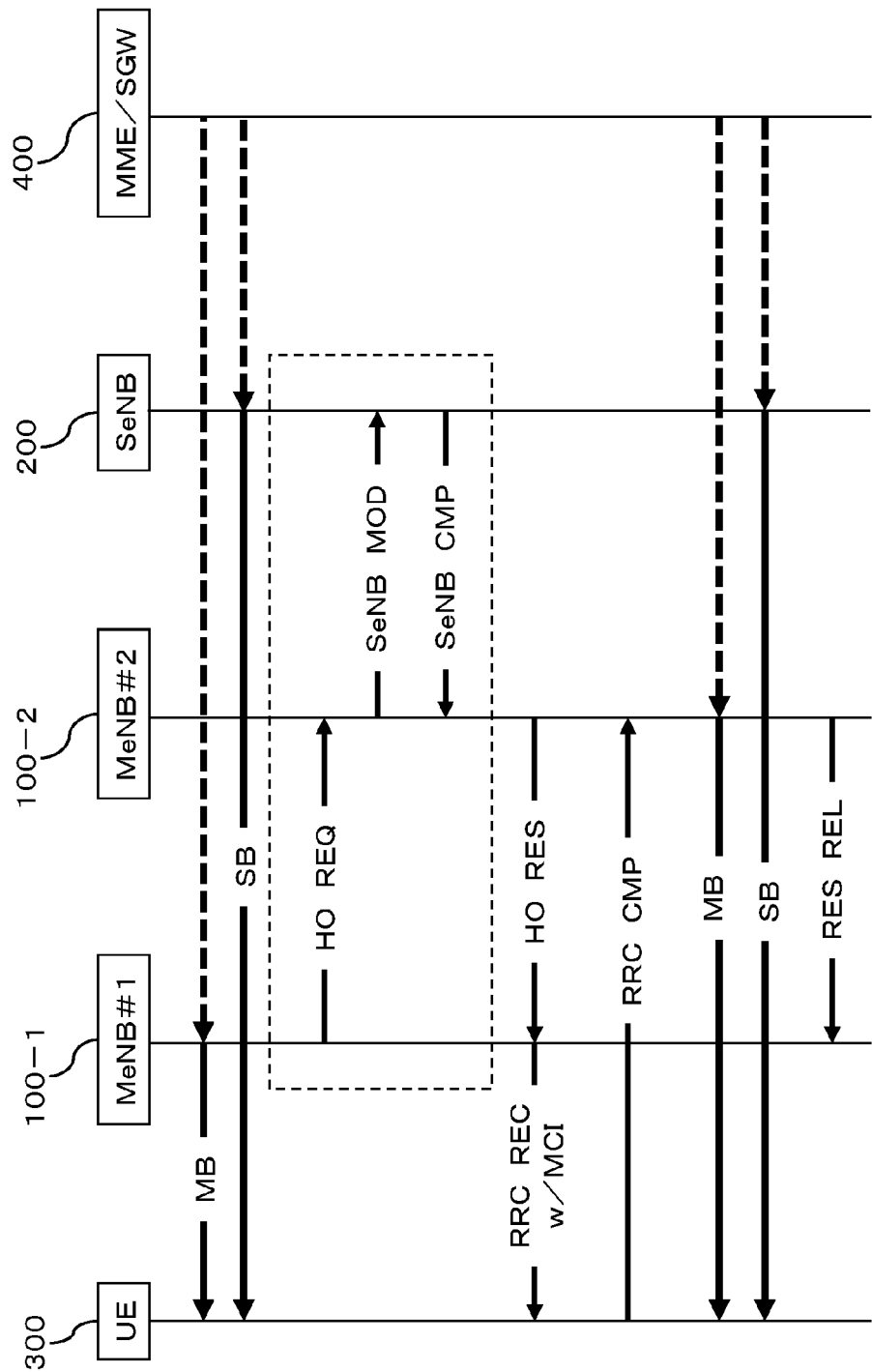
FIG. 19 is a sequence diagram illustrating an example compared with FIG. 17.

Therefore, it is possible to reduce delay in processing, for example, as compared to a case where the source base station 100-1 transmits an HO request to the target base station 100-2 and the target base station 100-2 negotiates with the secondary base station 200 about a change in the RRC connection (see FIG. 19).

For example, as can be seen from the comparison between FIG. 17 and FIG. 19 (dotted frame), the number of communication processes (in other words, communication processes through the X2 interface) between the base stations for the period from the transmission of the HO request to the transmission of the HO command to the UE 300 in the example illustrated in FIG. 17 can be one less than that in the example illustrated in FIG. 19.

Therefore, assuming that the delay time of communication through the X2 interface is about 10 ms, the time for the DC-HO in the example illustrated in FIG. 17 can be about at least 10 ms less than that in the example illustrated in FIG. 19.

Figure 18:
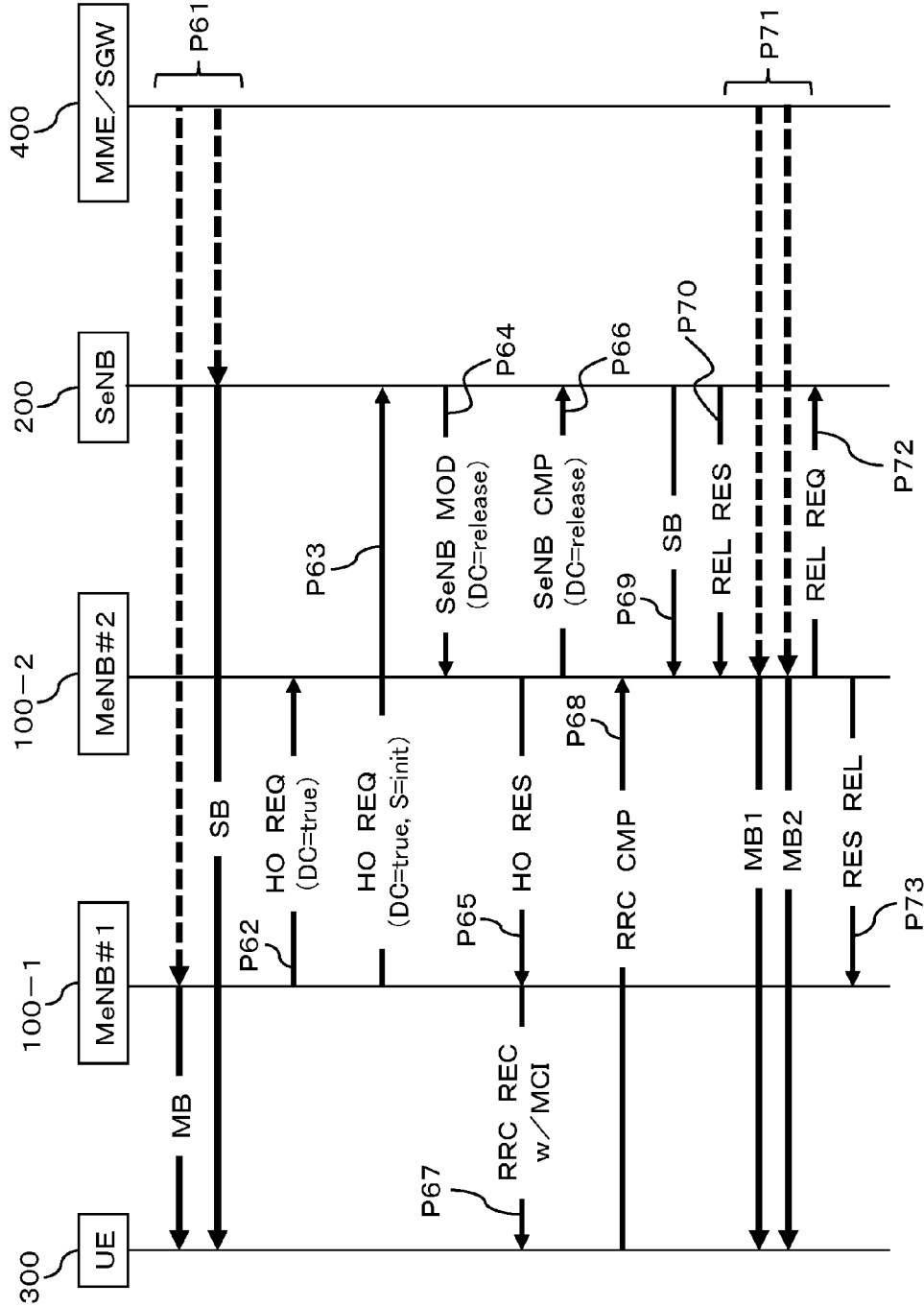
FIG. 18 is a sequence diagram illustrating an example of the wireless communication control according to the second embodiment.

In FIG. 16, when the UE 300 moves from the macro cell 101-1 to the small cell 201 and then moves away from the small cell 201 to the macro cell 101-2, the dual connectivity is released, and thus, a single connection with the macro cell 101-2 is available. FIG. 18 illustrates an example of a DC-HO sequence in this case.

As illustrated in FIG. 18, before the DC-HO is performed, the UE 300 receives a control plane signal from the master base station 100-1 through an MB and receives a user plane signal from the secondary base station 200 through an SB (Process P61).

Thereafter, when the UE 300 moves away from the master base station 100-1 to another macro cell 101-2, the master base station 100-1 determines to perform the DC-HO. Then, the master base station 100-1 transmits an HO request to the master base station 100-2 in the macro cell 101-2 serving as a DC-HO target and the secondary base station 200 (Processes P62 and P63).

The HO request addressed to the target base station 100-2 may include, for example, information serving as a DC-HO trigger (DC=true). The HO request addressed to the secondary base station 200 may include information serving as a DC-HO trigger (DC=true) and information (S=init) to permit the secondary base station 200 to use the RRC layer.

As described in the first embodiment, it may be considered that the HO request itself corresponds to information indicative of a permission for use of the RRC layer. In this case, the setting in which "S=init" is not included in the HO request is available. As described above, "DC=true" is a conceptual or expedient representation.

Upon receiving the HO request (DC=true) from the source base station 100-1, the DC-HO target base station 100-2 recognizes that the master base station 100-2 itself serves as a target base station. Further, the target base station 100-2 recognizes that a possibility of receiving of a request to maintain or release (DC=true or release) of the dual connectivity from the secondary base station 200 that is permitted to use the RRC layer.

Meanwhile, when the secondary base station 200 receives the HO request (DC=true, S=init) from the source base station 100-1, the DC-HO is triggered and the secondary base station 200 becomes in a state available to use the RRC layer. Upon detecting that the UE 300 departed from the small cell 201, the secondary base station 200 transmits an RRC layer message (SeNB MOD) indicative of the release (DC=Release) of the dual connectivity to the target base station 100-2 (Process P64).

Upon receiving the message, the target base station 100-2 transmits an HO response to the source base station 100-1 (Process P65). Further, the target base station 100-2 transmits an RRC layer message (SeNB CMP) indicative of a reception of the release of the dual connectivity to the secondary base station 200 (Process P66). The order of Process P65 and Process P66 may be exchangeable.

The source base station 100-1 that has received the HO response from the target base station 100-2 transmits an HO command to the UE 300 (Process P67). Upon receiving the HO command, the UE 300 transmits an RRC layer message (RRC CMP) indicative of a completion of an RRC connection with the target base station 100-2 (Process P68).

With receiving the message from the UE 300 by the target base station 100-2, an RRC connection is established between the target base station 100-2 and the UE 300.

Meanwhile, upon receiving the message (SeNB CMP) transmitted by the target base station 100-2 in Process P66, the secondary base station 200 transfers, before releasing the dual connectivity, a received user plane signal to the target base station 100-2 through the SB (Process P69).

When the transfer of the user plane signal is completed, the secondary base station 200 may transmit a resource release message to the target base station 100-2 (Process P70). Upon receiving the resource release message from the secondary base station 200, the target base station 100-2 may release the allocation of the radio resources that have been used for the SB between the target base station 100-2 and the UE 300, for example.

Thereafter, the UE 300 receives signals from the target base station 100-2 through the single connection of the MB between the UE 300 and the target base station 100-2 (Process P71). The target base station 100-2 may notifies an SB resource release request (REL REQ) message to the secondary base station 200 (Process P72). Upon receiving the SB resource release request message from the target base station 100-2, the secondary base station 200 may release the allocations of the radio resources of the SB, for example.

The target base station 100-2 may transmit a resource release (RES REL) message to the source base station 100-1 (Process P73). Upon receiving the resource release message from the target base station 100-2, the source base station 100-1 may release the allocation of the radio resources that have used for communication with the UE 300, for example.

As described above, upon performing the DC-HO, the secondary base station 200 that has received the permission for use of the RRC layer from the source base station 100-1 takes the initiative in controlling the release of the dual connectivity for the UE 300.

Therefore, similarly to the example described in the comparison between FIGS. 17 and 19, it is possible to reduce the number of communication processes (in other words, communication processes through the X2 interface) between the base stations. Accordingly, it is possible to reduce delay in processing and to increase the speed of processing in releasing the dual connectivity.

(Structure of Wireless Communication System)

Figure 20:
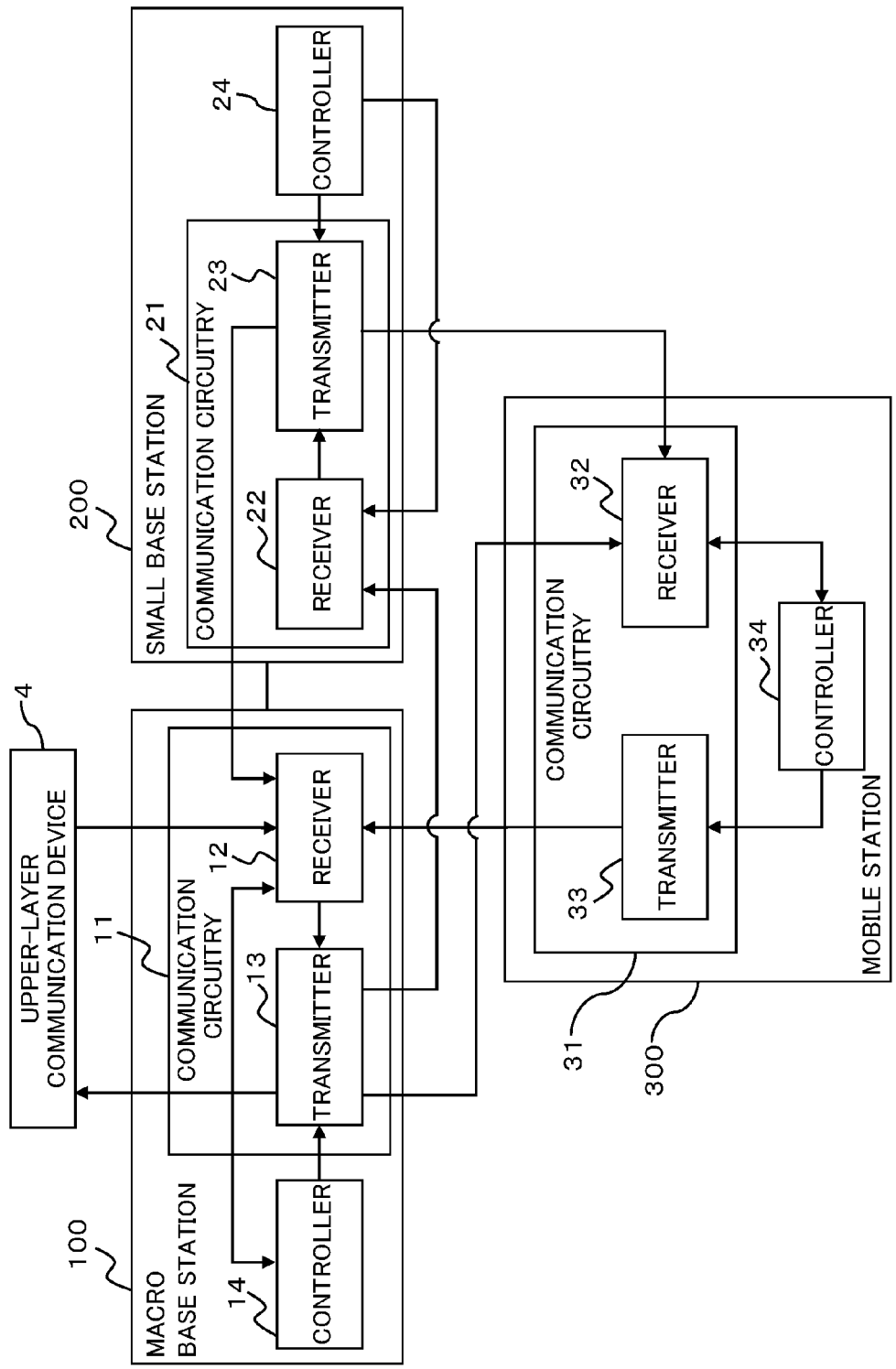
FIG. 20 is a block diagram illustrating an exemplary configuration of a wireless communication system according to each embodiment and each modification example.

FIG. 20 is a block diagram illustrating an exemplary configuration of the wireless communication system according to each of the embodiments and the modification examples. As illustrated in FIG. 20, for example, the macro base station 100 is connected to an upper-layer communication device 4 and is available to communicate with the core network (MME/SGW) 400 and another macro base station 100 through the upper-layer communication device 4. Similarly to the macro base station 100, the small base station 200 may be connected to an upper-layer communication device and may be available to communicate with the core network 400 through the upper-layer communication device, which is not illustrated in FIG. 20.

The macro base station 100 and the small base station 200 are communicably connected each other using the X2 interface, for example. Each of the macro base station 100 and the small base station 200 is communicably connected to the mobile station 300 through a radio link.

(Macro Base Station)

The macro base station 100 includes, for example, a communication circuitry 11 and a controller 14. The communication circuitry 11 is available to communicate with the small base station 200, the mobile station 300, and the upper-layer communication device 4. The communication circuitry 11 is available to perform the control plane communication and the user plane communication described in the above-mentioned embodiments. In other words, the communication circuitry 11 is available to wirelessly communicate with the UE 300 using multiple access which includes a connection through the small base station 200 and a connection without being routed through the small base station 200. The communication may include the transmission and reception of signals, such as the aforementioned commands or messages related to the HO.

The communication circuitry 11 includes, for example, a receiver 12 and a transmitter 13. The receiver 12 receives one or both of control data and user data from the upper-layer communication device 4. The control data may be considered as the control plane signal, and the user data may be considered as the user plane signal.

The receiver 12 is available to output one or both of the received control data and user data to the transmitter 13. The control data may be data generated by the macro base station 100 itself. The control data may include data such as the aforementioned commands or messages related to the HO.

The transmitter 13 is available to transmit the control data or the user data to any one of the upper-layer communication device 4, the small base station 200, and the mobile station 300 in response to a control of the controller 14. For example, the transmitter 13 is available to transmit the control data addressed to the mobile station 300 to the mobile station 300. Further, the transmitter 13 is available to transmit the user data addressed to the mobile station 300 to the mobile station 300 through the MB, and is available to transmit other user data to the small base station 200 through the SB.

The controller 14 controls the overall operation of the communication circuitry 11 that includes the receiver 12 and the transmitter 13. Further, the controller 14 is available to control data communication depending on communication conditions. The control performed by the controller 14 may include, for example, a detection of a failure in the radio link, a control related to the HO in response to the detection of the failure, a detection of an RLF, and a counting of the $T_1$ timer and the $T_2$ timer. The controller 14 is an example of a controller that controls a control plane (RRC layer) of the small base station 200 to control a connection between the UE 300 and the small base station 200.

(Small Base Station)

Meanwhile, the small base station 200 includes, for example, a communication circuitry 21 and a controller 24. The communication circuitry 21 is available to communicate with the macro base station 100 and the mobile station 300. The communication circuitry 21 is available to perform the control plane communication and the user plane communication described in the above-mentioned embodiments. In other words, the communication circuitry 21 is available to wirelessly communicate with the UE 300 using one of connections that forms the multiple access between the small base station 200 and the UE 300. The communication may include the transmission and reception of signals such as the aforementioned commands or messages related to the HO.

The communication circuitry 21 includes, for example, a receiver 22 and a transmitter 23. The receiver 22 is available to receive user data from the macro base station 100 through the X2 interface, for example, and is available to output the received user data to the transmitter 23.

The transmitter 23 is available to transmit the user data addressed to the mobile station 300, which has been received from the receiver 22, to the mobile station 300. Further, the transmitter 23 is available to transmit the control data or the user data to the macro base station 100 in response to a control of the controller 24.

The controller 24 controls the overall operation of the communication circuitry 21 that includes the receiver 22 and the transmitter 23. The controller 24 is available to control data communication depending on communication conditions. The control performed by the controller 24 may include, for example, a control related to the HO, a detection of an RLF, and a counting of the $T_1$ timer and the $T_2$ timer. The controller 24 is an example of a controller that controls a connection with the UE 300 by receiving a control of the control plane from the macro base station 100 that wirelessly communicates with the UE 300 through the multiple access.

(Mobile Station)

The mobile station 300 includes, for example, a communication circuitry 31 and a controller 34. The communication circuitry 31 is available to wirelessly communicate with the macro base station 100 and the small base station 200. In other words, the communication circuitry 31 is available to wirelessly communicate with a plurality of wireless base stations 100 and 200 through the multiple access. The communication circuitry 31 is available to perform the control plane communication and the user plane communication described in the above-mentioned embodiments. The communication may include the transmission and reception of signals such as the aforementioned commands or messages related to the HO.

The communication circuitry 31 includes, for example, a receiver 32 and a transmitter 33. The receiver 32 is available to receive control data and user data from the macro base station 100 and to receive user data from the small base station 200. For example, the receiver 32 is available to receive the user data transmitted from the macro base station 100 through the MB and to receive the user data transmitted from the macro base station 100 through the SB via the small base station 200.

The controller 34 controls the overall operation of the communication circuitry 31 that includes the receiver 32 and the transmitter 33. The controller 34 is available to control data communication depending on communication conditions. The control performed by the controller 34 may include, for example, a detection of a failure in a radio link, a control related to the HO, a detection of an RLF, and a counting of the $T_1$ timer and the $T_2$ timer. The controller 34 is an example of a controller that controls a connection using the control plane with the small base station 200 whose control plane is controlled by the macro base station 100.

The communication circuitries 11, 21, and 31 of the macro base station 100, the small base station 200, and the mobile station 300 are available to perform communications by using link layer protocols corresponding to a plurality of link layers. Examples of the link layer protocol include link layer protocols corresponding to a packet data convergence protocol (PDCP) layer, a radio link control (RLC) layer, a medium access control (MAC) layer, and a physical (PHY) layer.

In the RLC layer, automatic repeat request control is provided and user data in which an error has occurred in wireless transmission is retransmitted. When retransmission succeeds within a predetermined number of retransmission processes, a successful reception is determined. Meanwhile, when the number of retransmission processes is greater than a predetermined value, it is determined that an error has occurred and an RLF is detected. A radio link failure before the RLF is detected may be detected based on the number of retransmission processes.

In the above-mentioned example, the dual connectivity in which the mobile station 300 is connected to two wireless base stations of the macro base station 100 and the small base station 200 has been described. However, the same process as described above can be performed in the multiple access in which the mobile station 300 is connected to three or more wireless base stations.

(Example of Hardware Configuration)

Next, an example of the hardware configuration of the macro base station 100, the small base station 200, and the mobile station 300 in the above-mentioned examples will be described below.

(Wireless Base Station)

Figure 21:
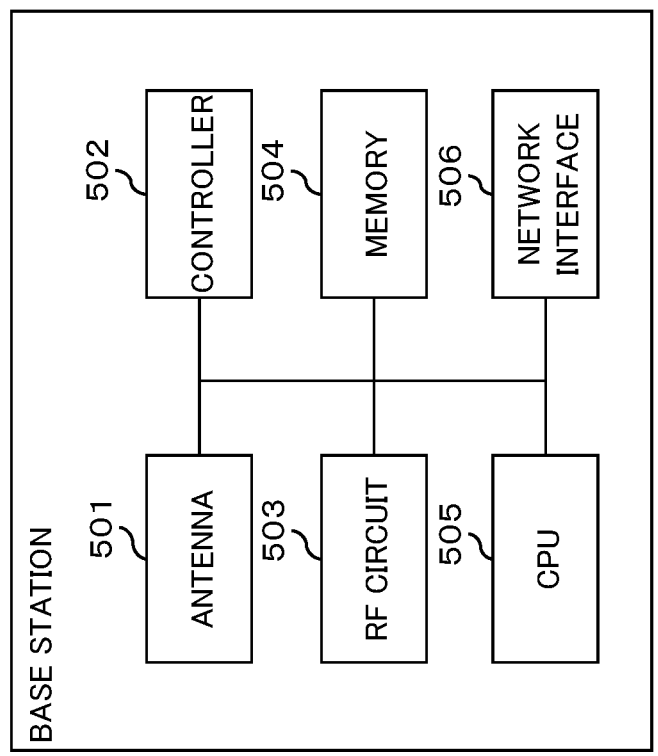
FIG. 21 is a block diagram illustrating an example of the hardware configuration of a wireless base station.

FIG. 21 is a block diagram illustrating an example of the hardware configuration of a wireless base station. For example, the wireless base station illustrated in FIG. 21 corresponds to the macro base station 100 and the small base station 200 and includes an antenna 501, a controller 502, a radio frequency (RF) circuit 503, a memory 504, a CPU 505, and a network interface 506, for example.

The antenna 501 transceives radio waves for the mobile station 300, for example.

The controller 502 implements, for example, the functions of the controller 14 of the macro base station 100 and the controller 24 of the small base station 200 illustrated in FIG. 20. The controller 502 may be a processor with a computing capability, such as a CPU or an MPU.

The network interface 506 is, for example, an interface to communicably connect the wireless base station to another wireless base station. For example, the macro base station 100 and the small base station 200 may be connected to each other through the network interface 506 with a wired connection.

The CPU 505, the memory 504, and the RF circuit 503 implement, for example, the functions of the communication circuitry 11 of the macro base station 100 and the communication circuitry 21 of the small base station 200 illustrated in FIG. 20. For example, the memory 504 may store programs or data to implement the functions of the communication circuitry 11 or the communication circuitry 21. The CPU 505 appropriately reads the programs or data stored in the memory 504 and implements the functions of the communication circuitry 11 or the communication circuitry 21 in cooperation with, for example, the RF circuit 503.

(Mobile Station)

Figure 22:
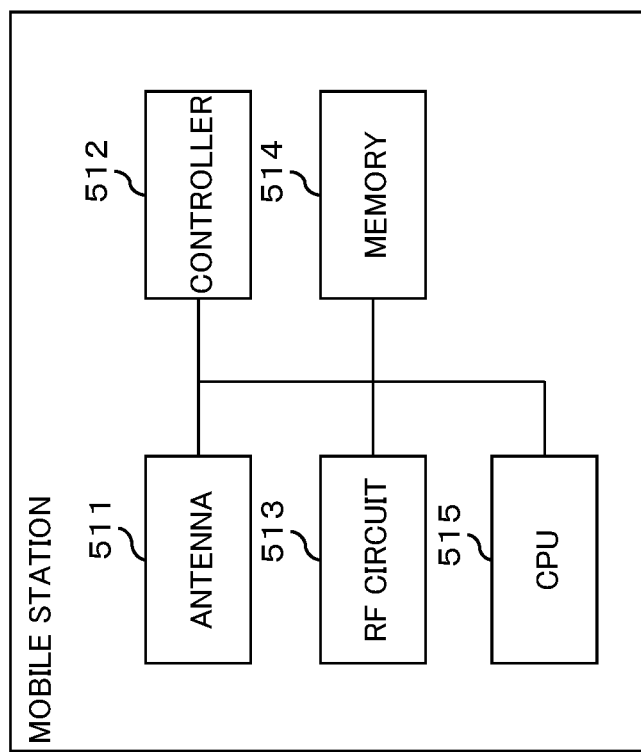
FIG. 22 is a block diagram illustrating an example of the hardware configuration of a mobile station.

FIG. 22 is a block diagram illustrating an example of the hardware configuration of a mobile station. The mobile station illustrated in FIG. 22 corresponds to, for example, the mobile station 300 and includes an antenna 511, a controller 512, an RF circuit 513, a memory 514 and a CPU 515, for example.

The antenna 511 transceives radio waves for one or both of the macro base station 100 and the small base station 200, for example.

The controller 512 implements, for example, the functions of the controller 34 of the mobile station 300 illustrated in FIG. 20.

The CPU 515, the memory 514, and the RF circuit 513 implement, for example, the functions of the communication circuitry 31 of the mobile station 300 illustrated in FIG. 20. For example, the memory 514 may store programs or data to implement the functions of the communication circuitry 31. The CPU 515 appropriately reads the programs or data stored in the memory 514 and implements the functions of the communication circuitry 31 in cooperation with, for example, the RF circuit 513.

All examples and conditional language provided herein are intended for pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, and alterations could be made hereto without departing from the spirit and scope of the invention.

What is claimed is:

1. A wireless communication system comprising:
a plurality of wireless base stations; and
a mobile station,
wherein the mobile station includes:
    a first communication circuitry configured to wirelessly communicate with the plurality of wireless base stations using radio resources provided by a wireless base station and another wireless base station connected via a network interface, where the mobile station establishes a control plane with the wireless base station and multiple user planes with both the wireless base station and the another wireless base station; and
    a first controller configured to control a connection between the mobile station and the another wireless base station by another control plane between the mobile station and the another wireless base station, where control messages of the another control plane are to be sent directly between the mobile station and the another wireless base station, while maintaining the control plane between the wireless base station and the mobile station, and
the wireless base station includes:
    a second communication circuitry configured to wirelessly communicate with the mobile station using the radio resources, where the wireless base station establishes the control plane and the multiple user planes with the mobile station; and
    a second controller configured to control the another control plane between the another wireless base station and the mobile station to control the connection between the mobile station and the another wireless base station, while maintaining the control plane between the wireless base station and the mobile station.

2. The wireless communication system according to claim 1,
wherein the wireless base station transmits information indicative of a permission to use the control plane to the another wireless base station, in response to a determination of a handover for the mobile station to the another wireless base station, and
the another wireless base station controls a connection with the mobile station using the control plane, in response to a reception of the information indicative of the permission to use the control plane.

3. The wireless communication system according to claim 2,
wherein the information indicative of the permission to use the control plane is included in a handover request to require the handover to the another wireless base station.

4. The wireless communication system according to claim 2,
wherein the control of the connection with the mobile station includes a control of a transmission of a handover command to the mobile station by the another wireless base station using the control plane.

5. The wireless communication system according to claim 2,
wherein the information indicative of the permission to use the control plane is transmitted to the another wireless base station in a phase after the wireless base station detects a deterioration in a quality of a wireless link with the mobile station until the wireless base station determines an occurrence of a failure in the wireless link.

6. The wireless communication system according to claim 1, wherein the wireless base station transmits context information of the mobile station to the second wireless base station, in response to a determination of a handover for the mobile station to the another wireless base station, and the another wireless base station controls a connection with the mobile station using the control plane, in response to a reception of the context information.

7. The wireless communication system according to claim 6, wherein the context information is included in a handover request to require the handover to the another wireless base station.

8. The wireless communication system according to claim 6, wherein the control of the connection with the mobile station includes a control of a transmission of a message to require the connection over the control plane from the mobile station to the another wireless base station.

9. The wireless communication system according to claim 6, wherein the context information is transmitted to the another wireless base station in a phase after the wireless base station detects a deterioration in a quality of a wireless link with the mobile station until the wireless base station determines an occurrence of a failure in the wireless link.

10. A wireless base station comprising:

a communication circuitry configured to wirelessly communicate with a mobile station using radio resources provided by the wireless base station and another wireless base station connected via a network interface, where the wireless base station establishes a control plane and multiple user planes with the mobile station; and a controller configured to control another control plane between the another wireless base station and the mobile station to control a connection between the mobile station and the another wireless base station, where control messages of the another control plane are to be sent directly between the another wireless base station and the mobile station, while maintaining the control plane between the wireless base station and the mobile station.

11. A mobile station comprising:

a communication circuitry configured to wirelessly communicate with a plurality of wireless base stations using radio resources provided by a wireless base station and another wireless base station connected via a network interface, where the mobile station establishes a control plane with the wireless base station and multiple user planes with both the wireless base station and the another wireless base station; and a controller configured to control a connection between the mobile station and the another wireless base station by another control plane between the mobile station and the another wireless base station, where control messages of the another control plane are to be sent directly between the mobile station and the another wireless base station, while maintaining the control plane between the wireless base station and the mobile station.

12. A wireless communication control method comprising:

wirelessly communicating, by a mobile station, with a plurality of wireless base stations using radio resources provided by a wireless base station and another wireless base station connected via a network interface, where the mobile station establishes a control plane with the wireless base stations and multiple user planes with both the wireless base station and the another wireless base station;

controlling, by the mobile station, a connection between the mobile station and the another wireless base station by another control plane between the mobile station and the another wireless base station, where control messages of the another control plane are to be sent directly between the mobile station and the another wireless base station, while maintaining the control plane between the wireless base station and the mobile station, wirelessly communicating, by the wireless base station, with the mobile station using the radio resources, where the wireless base station establishes the control plane and the multiple user planes with the mobile station, and controlling, by the wireless base station, the another control plane between the another wireless base station and the mobile station to control the connection between the mobile station and the another wireless base station, while maintaining the control plane between the wireless base station and the mobile station.

* * * * *